US012750479B2

(12) United States Patent
Pfaff et al.

(10) Patent No.: US 12,750,479 B2
(45) Date of Patent: Sep. 29, 2026

(54) ENCODER, DECODER AND METHODS FOR CODING A PICTURE USING A SOFT CLASSIFICATION

(71) Applicant: Fraunhofer-Gesellschaft zur Förderung der angewandten Forschung e.V., Munich (DE)

(72) Inventors: Jonathan Pfaff, Berlin (DE); Wang-Q Lim, Berlin (DE); Björn Stallenberger, Berlin (DE); Johannes Erfurt, Berlin (DE); Heiko Schwarz, Berlin (DE); Detlev Marpe, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 48 days.

(21) Appl. No.: 18/799,568

(22) Filed: Aug. 9, 2024

(65) Prior Publication Data

US 2025/0008096 A1 Jan. 2, 2025

Related U.S. Application Data

(63) Continuation of application No. PCT/EP2023/053573, filed on Feb. 14, 2023.

(30) Foreign Application Priority Data

Feb. 15, 2022 (EP) .................................... 22156877

(51) Int. Cl.

| | |
|---|---|
| ***H04N 19/117*** | (2014.01) |
| ***H04N 19/132*** | (2014.01) |
| ***H04N 19/82*** | (2014.01) |

(52) U.S. Cl.

CPC ......... *H04N 19/117* (2014.11); *H04N 19/132* (2014.11); *H04N 19/82* (2014.11)

(58) Field of Classification Search

CPC ..... H04N 19/117; H04N 19/132; H04N 19/82

(Continued)

(56) References Cited

U.S. PATENT DOCUMENTS 11,700,368 B2 * 7/2023 Zhang .................. H04N 19/174 375/236
12,323,608 B2 * 6/2025 Li .......................... H04N 19/31

(Continued)

FOREIGN PATENT DOCUMENTS

WO 2021244884 A1 12/2021

OTHER PUBLICATIONS

International Search Report and Written Opinion dated Apr. 12, 2023, issued in application No. PCT/EP2023/053573.

(Continued)

*Primary Examiner* — Jayanti K Patel
*Assistant Examiner* — Richard B Carter
(74) *Attorney, Agent, or Firm* — McClure, Qualey & Rodack, LLP

(57) ABSTRACT

An apparatus for decoding a picture from a binary representation of the picture is configured for reconstructing, based on the binary representation, samples of the picture; and for classifying the reconstructed samples for an adaptive in-loop filtering, ALF, using a soft classification such as a convolutional neural network, CNN.

29 Claims, 7 Drawing Sheets

(58) Field of Classification Search
USPC .......................................... 375/240.02, 236
See application file for complete search history.

(56) References Cited

U.S. PATENT DOCUMENTS

| | | | | |
|---|---|---|---|---|
| 2021/0344916 | A1* | 11/2021 | Kim | G06N 3/045 |
| 2022/0132117 | A1* | 4/2022 | Zhang | H04N 19/117 |
| 2024/0373027 | A1* | 11/2024 | Yu | H04N 19/13 |
| 2024/0397063 | A1* | 11/2024 | Sato | H04N 19/11 |

OTHER PUBLICATIONS

Karczewicz, M., et al.; "VVC In-Loop Filters;" IEEE Transactions on Circuits and Systems for Video Technology; vol. 31; No. 10; Apr. 2021; pp. 3907-3925.
Taquet, J., et al.; "Non-Linear Adaptive Loop Filter;" Joint Video Experts Team (JVET) of ITU-T SG 16 WP 3 and ISO/IEC JTC 1/SC 29/W 11; Jan. 2019 pp. 1-5.
Dai, Z., et al.; 'AHGII: Neural Network-based Adaptive Model Selection for CNN In-Loop Filtering; Joint Video Exploration Team of ISO/IEC JTCI/SC29/WGII and ITU-T SG.16; Oct. 2021; pp. 1-5.
Wang, L., et al.; "EE1-1.5: neural network based in-loop filter using depthwise separable convolution and regular convolution;" Joint Video Exploration Team of ISO/IEC JTC1/SC29/WG11 and ITU-T SG. 16; Oct. 2021; pp. 1-6.
Wiegand, T., et al.; "Advanced Video Coding for Generic Audio-visual Services;" Editing state of text relating to ITU-T Rec. H.264 | ISO/IEC 14496-10 Amendments 1 and 2H.264 and ISO/IEC 14496-10, vers. 1; 2003; pp. 1-385.
Wiegand, T., et al.; "Overview of the H.264/AVC video coding standard;" IEEE Trans. Circuits Syst. Video Technol.; vol. 13; Jul. 2003; pp. 1-19.
ITU-T and ISO/IEC; "High Efficiency Video Coding;" H.265 and ISO/IEC 23008-2; vers. 1; Apr. 2013; pp. 1-317.
Sullivan, G.J., et al.; "Overview of the high efficiency video coding (HEVC) standard;" IEEE Trans. Circuits Syst. Video Technol.; vol. 22; No. 12; Dec. 2012; pp. 1649-1668.
ITU-T and ISO/IEC; "Versatile Video Coding;" H.266 and ISO/IEC 23090-3; Aug. 2020; pp. 1-516.
Bross, B., et al.; "Overview of the Versatile Video Coding (VVC) Standard and its Applications;" IEEE Trans. Circuits Syst. Video Technol.; vol. 31; No. 10; Oct. 2021; pp. 3736-3764.
List, P., et al.; "Adaptive deblocking filter;" IEEE Trans. Circuits Syst. Video Technol.; vol. 13; No. 7; Jul. 2003; pp. 614-619.
Fu, C.M., et al.; "Sample adaptive offset in the HEVC standard;" IEEE Trans. Circuits Syst. Video Technol.; vol. 22; No. 12; Dec. 2012; pp. 1755-1764.
Tsai, C.Y., et al.; "Adaptive loop filtering for video coding;" IEEE Journal of Selected Topics in Signal Processing; vol. 7; No. 6; Dec. 2013; pp. 934-945.
Karczewicz, M., et al.; "Geometry transformation-based adaptive in-loop filter;" Proc. Picture Coding Symposium (PCS); 2016; pp. 1-5.
Chien, W.J., et al.; "JVET AHG report: Tool reporting procedure and testing (AHG13);" Joint Video Experts Team (JVET) of ITU-T SG 16 WP 3 an ISO/IEC JTC 1/SC 29/ WG 11; 17th JVET meeting; Jan. 2020; pp. 1-13.
Jia, W., et al.; "Residual Guided Deblocking With Deep Learning;" 2020 IEEE International Conference on Image Processing (ICIP); 2020; pp. 3109-3113.
Jia, C., et al.; "Content-Aware Convolutional Neural Network for In-Loop Filtering in High Efficiency Video Coding;" IEEE Transactions on Image Processing; vol. 28; No. 7; Jul. 2019; pp. 3343-3356.
Wang, M.Z., et al.; "Attention-Based Dual-Scale CNN In-Loop Filter for Versatile Video Coding;" IEEE Access; vol. 7; Sep. 2019; pp. 145214-145226.
Ma, D., et al.; "MFRNet: A New CNN Architecture for Post-Processing and In-loop Filtering;" IEEE Journal of Selected Topics in Signal Processing; vol. 15; Dec. 2021; pp. 378-387.
Ioffe, S., et al.; "Batch normalization: Accelerating deep network training by reducing internal covariate shift;" International Conference on Machine Learning (ICML); Mar. 2015; pp. 448-456.
Nair, V., et al.; "Rectified linear units improve restricted Boltzmann machines;" Proc. 27th Int. Conf. Mach. Learn. (ICML); 2010; pp. 807-814.
Howard, A.G., et al.; "Mobilenets: Efficient convolutional neural networks for mobile vision applications;" CVPR; Apr. 2017; pp. 1-9.
Goodfellow, I., et al.; "Batch normalization: Accelerating deep network training by reducing internal covariate shift;" Deep Learning; 2016; pp. 313-317.
Ma, D., et al.; "BVI-DVC: a training database for deep video compression;" arXiv:2003; Oct. 2020; pp. 1-11.
Kingma, D.P., et al.; Adam: A method for stochastic optimization;' Int. Conf. Learn. Represent. (ICLR); Dec. 2015; pp. 1-9.
Suehring, K., et al.; "JVET common test conditions and software reference configurations;" Joint Video Experts Team (JVET) of ITU-T SG 16 WP 3 an ISO/IEC JTC 1/SC 29/ WG 11; 2nd JVET meeting; Feb. 2016; pp. 1-4.

* cited by examiner

| layer | size | type | # (mul) |
|---|---|---|---|
| conv layer | (7, 7, 1, 4) | NS | 196 |
| 1st basic layer group | (3, 3, 8, 32) | NS | 2304 |
| 2nd basic layer group | (3, 3, 32, 64) | DS | 2336 |
| 3rd basic layer group | (3, 3, 64, 64) | DS | 4672/4 |
| 4th basic layer group | (3, 3, 64, 64) | DS | 4672/4 |
| 5th basic layer group | (3, 3, 64, 128) | DS | 8768/4 |
| 6th basic layer group | (3, 3, 128, 25) | DS | 4352/4 |
| 7th basic layer group | (3, 3, 25, 25) | DS | 850 |

Fig. 3

| class | low QP | | | high QP | | |
|---|---|---|---|---|---|---|
| | Y | U | V | Y | U | V |
| A1 | -3.25% | -0.04% | -0.04% | -3.72% | -0.07% | -0.07% |
| A2 | -3.68% | -0.05% | -0.05% | -5.10% | -0.08% | -0.07% |
| B | -3.59% | -0.06% | -0.06% | -4.65% | -0.10% | -0.09% |
| C | -3.79% | -0.15% | -0.15% | -4.55% | -0.27% | -0.27% |
| E | -5.14% | -0.23% | -0.22% | -5.85% | -0.32% | -0.31% |
| overall | -3.85% | -0.10% | -0.10% | -4.75% | -0.16% | -0.16% |
| D | -3.86% | -0.07% | -0.07% | -4.84% | -0.15% | -0.16% |
| enc time | 282% | | | 388% | | |
| dec time | 22358% | | | 27356% | | |

Fig. 5

| class | low QP | | | high QP | | |
|---|---|---|---|---|---|---|
| | Y | U | V | Y | U | V |
| A1 | -3.61% | -0.07% | -0.02% | -3.93% | 0.05% | 0.03% |
| A2 | -4.89% | -0.01% | -0.13% | -4.66% | 0.10% | 0.02% |
| B | -4.68% | -0.13% | -0.07% | -4.58% | 0.05% | 0.08% |
| C | -4.23% | 0.01% | -0.14% | -4.07% | -0.02% | -0.21% |
| overall | -4.39% | -0.06% | -0.09% | -4.33% | 0.04% | -0.02% |
| D | -5.41% | 0.41% | 0.43% | -5.23% | 0.44% | 0.49% |
| enc time | 276% | | | 374% | | |
| dec time | 35373% | | | 35803% | | |

Fig. 6

ENCODER, DECODER AND METHODS FOR CODING A PICTURE USING A SOFT CLASSIFICATION

CROSS-REFERENCES TO RELATED APPLICATIONS

This application is a continuation of copending International Application No. PCT/EP2023/053573, filed Feb. 14, 2023, which is incorporated herein by reference in its entirety, and additionally claims priority from European Application No. EP 22 156 877.7, filed Feb. 15, 2022, which is incorporated herein by reference in its entirety.

Embodiments of the invention relate to an encoder for encoding a picture to a binary representation of the picture. Further embodiments of the invention relate to an apparatus and decoders for decoding a picture from a binary representation of the picture. Further embodiments relate to methods for encoding a picture and to methods for decoding a picture, e.g., using said encoder, apparatus, decoder respectively and to a bit-stream.

Some embodiments of the invention relate to an adaptive loop filter with a convolutional neural network, CNN, based classification.

BACKGROUND OF THE INVENTION

Modern video coding standards such as H.264/AVC [1, 2], H.265/HEVC [3, 4] or the recently finalized H.266/VVC [5,6] initially exhibit coding artifacts due to quantization as well as block-based prediction and transforms. Such artifacts may manifest in artificial discontinuities along block boundaries, distorted high-frequency information near sharp transitions, or over-smoothing of edges, where they are referred to as blocking, ringing or blurring artifacts respectively. In order to reduce them, in-loop filtering has emerged as a key tool. Starting with AVC, a deblocking filter (DBF) has been introduced [7]. In HEVC, also the sample adaptive offset (SAO) [8] was included. Finally, the adaptive in-loop filter (ALF) [9, 10, 11] has been adopted to VVC as a third in-loop filter after DBF and SAO. Experimental results show that ALF significantly contributes to the overall compression performance of VVC [12].

SUMMARY

An embodiment may have an apparatus for decoding a picture from a binary representation of the picture, wherein the apparatus is configured for:

reconstructing, based on the binary representation, samples of the picture; and classifying the reconstructed samples for an adaptive in-loop filtering, ALF, using a soft classification such as a convolutional neural network, CNN.

Another embodiment may have an apparatus for encoding a picture to a binary representation of the picture, wherein the apparatus is configured for:

receiving a frame associated with a digital representation of a picture;

deriving samples from the frame;

classifying the reconstructed samples for an adaptive in-loop filtering, ALF, using a convolutional neural network, CNN; and providing a bitstream allowing to reconstruct the samples.

Another embodiment may have an An apparatus for decoding a picture from a binary representation of the frame, wherein the apparatus is configured for:

reconstructing, based on the binary representation, samples of the frame; and classifying the reconstructed samples using a soft classification to obtain classified samples; and filtering the classified samples using an FIR filter.

Another embodiment may have a decoder that decodes a flag per sequence or per frame or per block which determines whether to apply a modification of the reconstructed samples on that block according to $$\hat{y}(i) = \sum_{j=1}^{N} \phi_j(i) \cdot (f_j \star y)(i),$$

or not.

Another embodiment may have a decoder that decodes a flag per sequence or per frame or per block which determines whether to apply a modification of the reconstructed samples on that block according to $$\hat{y}(i) = \sum_{j=1}^{N} (g_j \star z_j)(i)$$

or not.

Another embodiment may have a decoder that decodes a flag per frame or per block which determines whether a modification of the reconstructed samples on that block according to $$\hat{y}(i) = \sum_{j=1}^{N} \phi_j(i) \cdot (f_j \star y)(i),$$

or according to $$\hat{y}(i) = \sum_{j=1}^{N} (g_j \star z_j)(i)$$

is to be applied.

Another embodiment may have a decoder for which multiple loop filters according to $$\hat{y}(i) = \sum_{j=1}^{N} \phi_j(i) \cdot (f_j \star y)(i),$$

are applicable and which decodes per frame or per block an index determining which of these multiple loop filters is applied for the given frame/block, e.g., if the functions $\phi$ of the multiple applicable loop filters are realized by a convolutional neural network, CNN, they may share some weights for some layers but differ in other weights/layers.

Another embodiment may have a decoder for which multiple loop filters according to $$\hat{y}(i) = \sum_{j=1}^{N} (g_j \star z_j)(i)$$

are applicable and which decodes per frame or per block an index determining which of these multiple loop filters is applied for the given frame/block; wherein some of these multiple loop filters may be equal in some parameters that describe the function ϕ, e.g., if the functions ϕ of the multiple applicable loop filters are realized by a convolutional neural network, CNN, they may share some weights for some layers but differ in other weights/layers.

Another embodiment may have a decoder where a loop filtering process according to $$\hat{y}(i) = \sum_{j=1}^{N} \phi_j(i) \cdot (f_j \star y)(i),$$

is applied to the luma-component only, while a second loop filtering process that is processed independently or dependent from said loop filtering process is applied to the chroma components.

Another embodiment may have a decoder where a loop filtering process according to $$\hat{y}(i) = \sum_{j=1}^{N} (g_j \star z_j)(i)$$

is applied to the luma-component only, while a second loop filtering process that is processed independently or dependent from said loop filtering process is applied to the chroma components.

Another embodiment may have an encoder that encodes a frame using a loop filter described by $$\hat{y}(i) = \sum_{j=1}^{N} \phi_j(i) \cdot (f_j \star y)(i),$$

for at least some parts of the frame.

Another embodiment may have an encoder that encodes a frame using a loop filter described by $$\hat{y}(i) = \sum_{j=1}^{N} (g_j \star z_j)(i)$$

for at least some parts of the frame.

Another embodiment may have a method for operating an apparatus for decoding a picture from a binary representation of the picture, the method comprising:

reconstructing, based on the binary representation, samples of the picture; and classifying the reconstructed samples for an adaptive in-loop filtering, ALF, using a soft classification such as a convolutional neural network, CNN.

Another embodiment may have a method for operating an apparatus for encoding a picture to a binary representation of the picture, wherein the method comprising:

receiving a frame associated with a digital representation of a picture;

deriving samples from the frame;

classifying the reconstructed samples for an adaptive in-loop filtering, ALF, using a convolutional neural network, CNN; and providing a bitstream allowing to reconstruct the samples.

Another embodiment may have a method for operating an apparatus for decoding a picture from a binary representation of the frame, wherein the method comprising:

reconstructing, based on the binary representation, samples of the frame; and classifying the reconstructed samples using a soft classification to obtain classified samples; and filtering the classified samples using an FIR filter.

Another embodiment may have a method for operating a decoder, the method comprising:

decoding a flag per sequence or per frame or per block which determines whether to apply a modification of the reconstructed samples on that block according to $$\hat{y}(i) = \sum_{j=1}^{N} \phi_j(i) \cdot (f_j \star y)(i),$$

or not; and operating accordingly.

Another embodiment may have a method for operating a decoder, the method comprising:

decoding a flag per sequence or per frame or per block which determines whether to apply a modification of the reconstructed samples on that block according to $$\hat{y}(i) = \sum_{j=1}^{N} (g_j \star z_j)(i)$$

or not; and operating accordingly.

Another embodiment may have a method for operating a decoder, the method comprising:

decoding a flag per frame or per block which determines whether a modification of the reconstructed samples on that block according to $$\hat{y}(i) = \sum_{j=1}^{N} \phi_j(i) \cdot (f_j \star y)(i),$$

or according to $$\hat{y}(i) = \sum_{j=1}^{N} (g_j \star z_j)(i)$$

is to be applied; and operating accordingly.

Another embodiment may have a method for operating a decoder for which multiple loop filters according to $$\hat{y}(i) = \sum_{j=1}^{N} \phi_j(i) \cdot (f_j \star y)(i),$$

are applicable, the method comprising:

decoding per frame or per block an index determining which of these multiple loop filters is applied for the given frame/block, e.g., if the functions ϕ of the multiple applicable loop filters are realized by a convolutional neural network, CNN, they may share some weights for some layers but differ in other weights/layers; and operating accordingly.

Another embodiment may have a method for operating a decoder for which multiple loop filters according to $$\hat{y}(i) = \sum_{j=1}^{N} (g_j \star z_j)(i)$$

are applicable, the method comprising:

decoding per frame or per block an index determining which of these multiple loop filters is applied for the given frame/block; wherein some of these multiple loop filters may be equal in some parameters that describe the function ϕ, e.g., if the functions ϕ of the multiple applicable loop filters are realized by a convolutional neural network, CNN, they may share some weights for some layers but differ in other weights/layers.

Another embodiment may have a method for operating a decoder, the method comprising:

applying a loop filtering process according to $$\hat{y}(i) = \sum_{j=1}^{N} \phi_j(i) \cdot (f_j \star y)(i),$$

to a luma-component of a picture or frame to be decoded only; and applying a second loop filtering process that is processed independently or dependent from said loop filtering process to chroma components of the picture or frame.

Another embodiment may have a method for operating a decoder, the method comprising:

applying a loop filtering process according to $$\hat{y}(i) = \sum_{j=1}^{N} (g_j \star z_j)(i)$$

to a luma-component of a picture or frame to be decoded only, and applying a second loop filtering process that is processed independently or dependent from said loop filtering process to chroma components of the picture or frame.

Another embodiment may have a method for operating an encoder, the method comprising:

encoding a frame using a loop filter described by $$\hat{y}(i) = \sum_{j=1}^{N} \phi_j(i) \cdot (f_j \star y)(i),$$

for at least some parts of the frame.

Another embodiment may have a method for operating an encoder, the method comprising:

encoding a frame using a loop filter described by $$\hat{y}(i) = \sum_{j=1}^{N} \phi_j(i) \cdot (f_j \star y)(i),$$

for at least some parts of the frame.

Another embodiment may have a computer readable digital storage medium having stored thereon a computer program having a program code for performing, when running on a computer, the inventive methods.

Another embodiment may have a bitstream generated by an inventive encoder or encoding apparatus; or received by an inventive decoder or decoding apparatus.

It is a general urge in video and image coding, to improve the tradeoff between a low size of a compressed image and a low distortion of the reconstructed image, such distortions recognizable as artifacts.

BRIEF DESCRIPTION OF THE DRAWINGS

Embodiments of the present invention will be detailed subsequently referring to the appended drawings, in which:

FIG. 3 an example table representing possible parameter settings for basic layer groups of a convolutional neural network according to an embodiment;

FIG. 5-6 show schematic results for illustrating a BD-rate saving and codec complexity of embodied methods over the VVC reference software VTM 13.0 under AI and RA configurations respectively.

DETAILED DESCRIPTION OF THE INVENTION

Figure 1A:
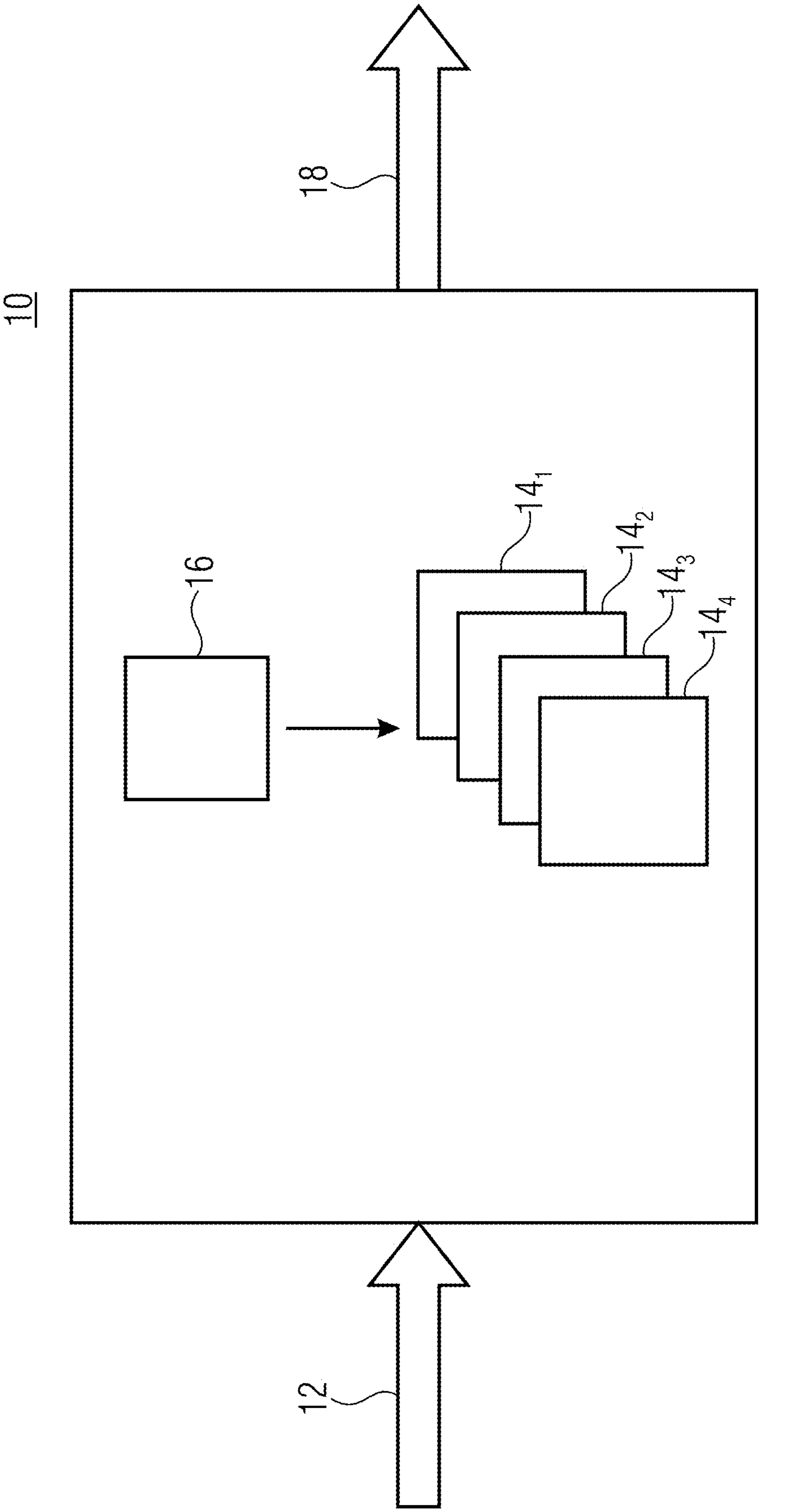
FIG. 1*a* shows a schematic block diagram of a decoding apparatus according to an embodiment.

In the following, embodiments are discussed in detail, however, it should be appreciated that the embodiments provide many applicable concepts that can be embodied in a wide variety of image compression, such as video and still image coding. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

At least some embodiments are based on the recognition that the basic idea of ALF is to classify the reconstructed samples into multiple classes based on local activity and directionality. Then, the samples in each class are filtered with an FIR-filter that depends on the class. The filter-coefficients of the FIR-filters are either signalled or belong to a predetermined set of filter coefficients. The FIR-filtering process may be complemented by a non-linear clipping operation.

The sample-value based classification into different sets for FIR filtering may be of key importance for the compression benefit of ALF. On the other hand, the inventors found that convolutional neural networks (CNN) comprise a powerful tool to solve a variety of classification tasks. Thus, it was investigated whether CNNs can also be used for the classification step of ALF in order to further improve its compression performance. For this approach, the hard-classification of ALF may be replaced by a soft one. Embodiments thus propose an in-loop filter which computes a weighted sum of FIR-filtered versions of the reconstructed frame, where the weighting factors are sample-adaptive and are determined by a CNN. To further improve compression efficiency, a second filtering step may be added. The approach defined in embodiments may be a contribution to the general emerging field of CNN-based in-loop filters, [13, 14, 15, 16].

The present specification describes a brief review of the ALF algorithm and then describes a CNN based in-loop filter according to embodiments. Further, the complexity of the proposed approach is analysed and simulation results are shown.

In the following, a details related to the adaptive in-loop filtering are presented ALF partitions the reconstructed samples into L=25 classes $C_k$. To each class, an FIR filter $f_k$ is associated. If y is the input frame to be filtered by ALF, the ALF process can be summarized as $$y = y + \sum_{k=1}^{L} XC_k \cdot (y * f_k) \tag{1}$$

Here, _$XC_k$ is the characteristic function of $C_k$ defined by $$XC_k(i) = \begin{cases} 0 & i \in C_k \\ 1 & i \notin C_k \end{cases} \text{ for } i \in I$$

where l is a set of all sample locations for y.

The coefficients of the filters $f_k$ may be signalled in which case they are derived at the encoder such that the mean squared error between the target frame and ŷ is minimized while the data rate to transmit the coefficients stays sufficiently small. The classes $C_k$ are computed out of local Laplacian and directional activity.

FIG. 1*a* shows a schematic block diagram of a decoding apparatus 10 according to an embodiment. The decoding apparatus 10 may be configured for receiving a bit-stream 12 that contains information representing a binary or digital representation of a picture, e.g., a still image or a picture of a video. The decoding apparatus 10 is configured for reconstructing, based on the binary representation, a plurality of samples 14$_1$ to 14$_4$ of the picture. The apparatus comprises a classifier 16 configured for classifying the reconstructed samples 14$_1$ to 14$_4$ for an adaptive in-loop filtering, ALF, using a soft classification. A possible soft classification may be obtained from a convolutional neural network, CNN. The apparatus 10 may be configured for providing a reconstructed, filtered picture 18 based on the ALF. The apparatus may operate in accordance with a known ALF in which the known hard classification is replaced by classifier 16 that enables a soft classification.

In the following, details relating to convolutional neural networks (CNN) in connection with embodiments present herein are described.

The proposed CNN based in-loop filter, e.g., the operation of classifier 16 may be defined by $$\hat{y} = y + \sum_{k=1}^{L} \Phi_k(y \mid \Theta) \cdot (y * f_k) \tag{2}$$

Here, $\Phi_1, \ldots, \Phi_L$ may denote the classification outputs of a trained CNN-based classifier with trained parameters Φ and $f_k$ denotes FIR-filters that are also determined during training. This can be seen as an extension of formula (1) where the ALF classifier is replaced by a CNN classifier.

According to an embodiment, the apparatus is configured for enhancing functionality of a H.266 or VVC decoder or is such a decoder having an enhanced functionality.

According to an embodiment, the soft classification 16 is configured for classifying the samples into a number of classes and to applying an associated filter to each of the classes, wherein each sample is associated with at least one class.

According to an embodiment, the associated filters are implemented, at least partly, as a finite impulse response, FIR, filter.

According to an embodiment, the ALF is implemented according to formula (1), i.e., $$y = y + \sum_{k=1}^{L} XC_k \cdot (y * f_k) \tag{1}$$

wherein ŷ is a result of the adaptive in-loop filtering; y is a reconstructed frame prior to in-loop filtering; L is a number of classes into which the classes are classified; $\chi C_k$ is the characteristic function of class C having index k and $f_k$ is the FIR filter associated with class k; and wherein the soft classification is implemented to provide for a substitution of the characteristic function.

Figure 2:
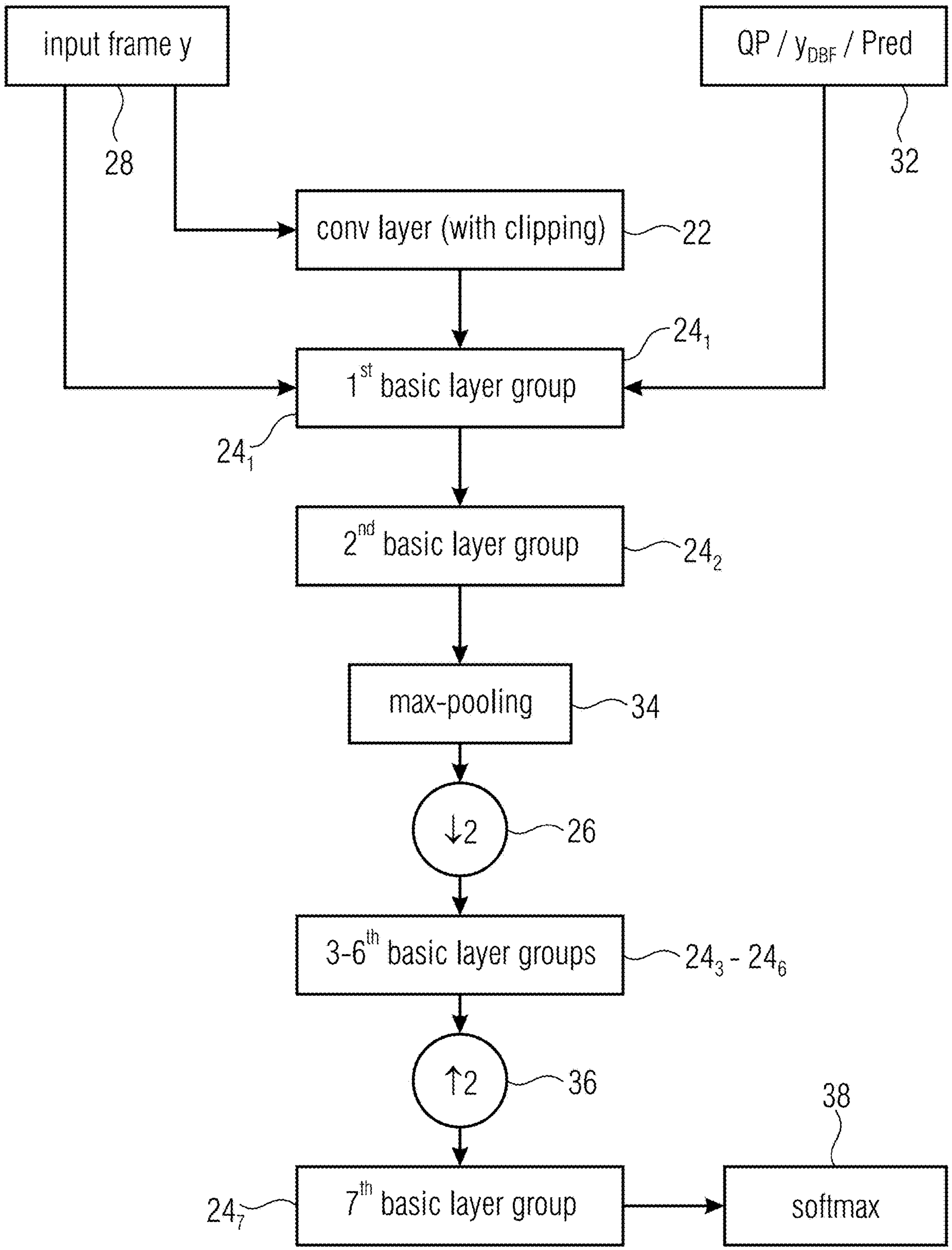
FIG. 2 shows a schematic block diagram of a possible implementation of the classifier of FIG. 1*a* according to an embodiment.

According to an embodiment, the soft classification is implemented at least in parts by a CNN that comprises a convolution layer and a first to seventh basic layer group as shown in FIG. 2.

According to an embodiment, the CNN comprises exactly one convolution layer 22 and exactly 7 basic layer groups 24$_1$ to 24$_7$.

Figure 1B:
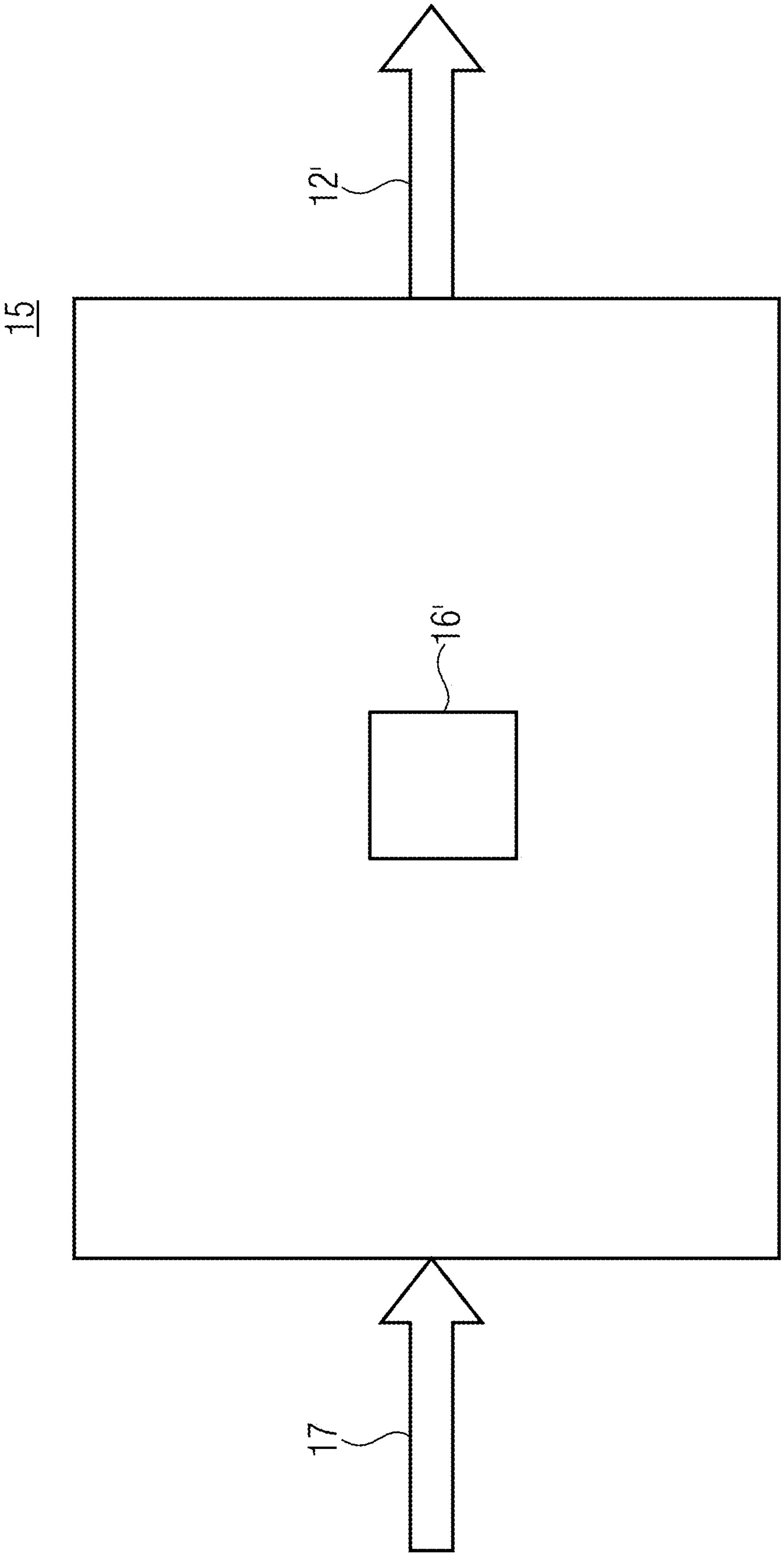
FIG. 1*b* is a schematic representation of an encoder or encoding apparatus according to at least one embodiment described herein.

FIG. 1*b* is a schematic representation of an encoder or encoding apparatus 15 according to at least one embodiment described herein. The encoder 15 may comprise a classifier 16' that may operate in accordance with the decoding apparatus. The encoder 15 may operate, in addition or as an alternative in a different way described herein to generate the bitstream 12 from a picture or frame 17, e.g., using respective filter structures and/or processing units.

In the following, an example classifier that is based on a CNN is described in more detail.

1. CNN Classifier

FIG. 2 shows a schematic block diagram of a possible implementation of the classifier 16 of FIG. 1*a* according to an embodiment. As illustrated in FIG. 2, the CNN classifier in (2) may comprise a single convolutional layer 22 and multiple basic layer groups 24$_1$ to 24$_7$ where convolutional layer (Conv) 22, a batch-normalization (BN) [17] and the rectified linear (ReLU) activation function [18] are applied respectively. The parameter settings for each basic layer group 24$_1$ to 24$_7$ are delineated in the table shown in FIG. 3. Showing example values for the respective layer (column layer), the respective size of a kernel and input/output channels (column size), a type of convolution (column type) and a number of multiplications (column #(mul)).

That is, according to an embodiment, the decoding apparatus is configured to implement the soft classification by convoluting, batch-normalizing implementing a rectified linear (ReLU) activation function.

In other words, FIG. 3 shows an example architecture of the CNN-based classifier used in embodiments described herein. In the second column, (_;_;_; _) indicates a kernel size (the first two entries) and the number of input/output channels (the last two entries). In the third column, the type of convolution (NS: non-separable/DS: depth-wise separable) is given. The number of multiplications per sample for layer is given in the last column, where the scaling factor ¼ (in 5-8th rows) is due to the downsampling operator 26 that is represented by ↓2 in FIG. 2 is applied for 3rd-6th basic layer groups 24$_3$ to 24$_6$. Such a structure of the CNN shown in FIG. 3 may relate to a size (a, b, c, d) that refers to kernel sizes a and b, a number of input channels c and a number of output channels d; wherein a type of the layer indicates a type of convolution as non-separable, NS; or depth-wise separable, DS; and wherein #(mul) indicates a number of multiplications of the layer.

According to an embodiment, the ALF comprising the CNN to implement at least a part of the soft classification, the CNN being based on formula (2), i.e., $$\hat{y} = y + \sum_{k=1}^{L} \Phi_k(y \mid \Theta) \cdot (y * f_k) \tag{2}$$

wherein ŷ is a result of the adaptive in-loop filtering; y is a reconstructed frame prior to in-loop filtering; L is a number of classes into which the classes are classified; $\Phi_1, \ldots, \Phi_L$ define the classification outputs and $f_k$ is the FIR filter associated with class k, ⊖ defining the weights of a at least one, of some or all layers of the CNN.

1.1 Additional Input Data

In addition to the input frame 28 (*y*), a quantisation parameter plane, QP-parameter plane QP, the reconstructed frame before deblocking $y_{DBF}$ and the prediction signal Pred are fed as an input 32 to the first basic layer group 24$_1$. The former QP-parameter plane is defined as a constant input plane filled with the normalized QP-value. Adding such a plane as an input allows to use a unified model for all QP values. Furthermore, the inputs $y_{DBF}$ and Pred may help the classifier to identify compression artifacts more accurately. In summary, the first basic layer group in FIG. 2 may comprise or possess 8 input channels comprised by the 4 output channels from the first convolutional layer 24$_1$, the reconstructed input frame, and the three aforementioned additional input planes of input 32.

That is, according to an embodiment, the apparatus is configured to implement the soft classification by use of a CNN that is adapted to use, for classifying the reconstructed samples of a frame, at least one of:

- a quantization parameter, QP, information, e.g., a QP parameter plane;
- a reconstructed version of the frame prior to a deblocking filter, DBF; and
- a prediction signal from an inter or intra prediction based on the frame.

According to an embodiment, a 1$^{st}$ basic layer group of a CNN of the soft classification is adapted to receive 8 input channels, preferably exactly 8 input channels. According to an advantageous embodiment, the 8 input channels comprise:

- a quantization parameter, QP, information, e.g., a QP parameter plane;
- a reconstructed version of the frame prior to a deblocking filter, DBF; and
- a prediction signal from an inter or intra prediction based on the frame.
- four output channels of a convolutional layer connected to the 1$^{st}$ basic layer; and
- the reconstructed input frame.

1.2 Subsampling

One main purpose of the classifier 16, e.g., represented in (2) may be to identify dominant features around a sample location. It may be likely that those features are shared by all sample locations in sufficiently small local neighbourhood. In fact, the ALF classifier in (1) performs 4×4 block based classification providing the same class index for each of 4×4 blocks and this significantly reduces its complexity. The same principle can be applied for the embodied CNN classifier 16 and may be implemented by a subsampling operator 26. More precisely, a max pooling operator 34 with 3×3 window followed by a 2DN downsampling 26 with factor 2 may be applied to the output channels of the second basic layer group 242 in FIG. 2. In the last layer of the CNN, the downsampling step may be reverted by an upsampling 36 with trained upsampling filters.

That is, according to an embodiment, the apparatus 10 may be adapted that the soft classification is to identify dominant features around a sample location.

According to an embodiment, the soft classification comprises a subsampler for providing a subsampling operator.

According to an embodiment, for implementing the subsampling operator, the soft classification comprises a CNN that comprises a max pooling operator 34 with 3×3 window followed by a 2DN downsampling 26 with factor 2 that is applied to output channels of a second basic layer group of the CNN; wherein in a last layer of the CNN, the downsampling step is reverted by an upsampling 36 with trained upsampling filters.

1.3 Depth-Wise Separable Convolution

The complexity of a convolutional layer with normal convolution may be given by $k_1 \cdot k_2 \cdot n_{in} \cdot n_{out}$ multiplications per sample, where $k_1 \times k_2$ is the size of each kernel and $n_{in/out}$ are the number of input and output channels. Using depth-wise separable convolution [19], this complexity can be significantly reduced by splitting the filtering process into two parts. First, a 2D convolution with a $k_1 \times k_2$ kernel may be performed independently over each input channel. Subsequently, a full convolution, but with 1×1 kernels may be applied across all channels. Overall, this may require $k_1 \cdot k_2 \cdot n_{in} + n_{in} \cdot n_{out}$ multiplications per sample.

According to an embodiment, the soft classification of apparatus 10 is configured for a depth-wise separable convolution, DS.

For example, according to an embodiment, the depth-wise separable convolution comprises a filtering process in two parts; wherein a first part comprises a 2D convolution with a $k_1 \times k_2$ kernel that is performed independently over each input channel of the soft classification; wherein a second part comprises a full convolution but with 1×1 kernels that is applied across all input channels. Such a depth-wise separable convolution is described in [19].

1.4 Soft classification

A later or even the final step of CNN classifier is to apply a softmax function 38 as described in [20]. Thus, if $\Psi_l$ are the output channels of the 7th basic layer group, the classification outputs $\phi_k$ in (2) are given as $$\phi_k(i) = \frac{\exp(\psi_k(i))}{\sum_{l=1}^{L} \exp(\psi_l(i))} \text{ for } i \in I \tag{3}$$

It is noted that $\phi_k(i)$ can be interpreted as an estimated probability that the corresponding sample location $i \in I$ is associated with a class index k. Unlike the classification process of ALF, the classification outputs $\phi_k$ of the CNN classifier do not necessarily provide a partition of I.

According to an embodiment, the soft classification is adapted for applying a softmax function 38 to an output channel of a last, e.g. seventh, basic layer group 24$_7$ of the soft classification.

According to an embodiment, the softmax function 38 comprises a structure based on $$\phi_k(i) = \frac{\exp(\psi_k(i))}{\sum_{\ell=1}^{L} \exp(\psi_\ell(i))} \text{ for } i \in I.$$

wherein $\Phi_k(i)$ is intpretable as an estimated probability that the corresponding sample location $i \in I$ is associated with a class of index k; $\Phi_k$ is a classification output; and $\psi_l$ are the output channels of the last basic layer group.

2. Filtering

A possible second step of a CNN inloop filter according to (2) is to apply filtering with multiple 2D filters $f_k$ corresponding to the different classes. Embodiments introduce some additional features of the CNN in-loop filter to make this simple filtering process even more efficient. That is, according to an embodiment, wherein the ALF is adapted for applying multiple 2D filters ($f_k$) for different classes k to the classified samples.

2.1. Clipping Operator

In [21], a non-linear modification has been proposed for the final design of ALF in VVC. The basic idea is to use a clipping function, see layer 22) to reduce the impact of neighbour sample values when they are too different with the current sample value being filtered. Thus, at sample location x, the filtering of the input signal y with a 2D-filter f may be modified to $$\sum_{i \neq (0,0)} f(i)\text{Clip}(y(x+i) - y(x), \rho(i)) \tag{4}$$

Here, Clip is the clipping function defined by Clip(d, b)=min(b; max(−b, d)) and ρ(i) is some parameter that is signalled in the bit-stream. According to embodiments, the same nonlinear operation with trained clipping parameters ρ(i) is applied also for the filtering process $y*f_k$ from equation (2) and for the first convolutional layer of the classifier, as displayed in FIG. 2. For notational simplicity, the 2D-convolution including the clipping is still denoted by $y*f_k$. Here, during training, the clipping operation may be replaced by the hyperbolic tangent in order to avoid vanishing gradients.

Accordingly, according to embodiment, the ALF is adapted for filtering the classified samples with a clipping function to reduce the impact of neighbour sample values when they are too different with the current sample value being filtered.

According to an embodiment, the clipping function is based on the determination rule of formula 4, i.e., $$\sum_{i \neq (0,0)} f(i)\text{Clip}(y(x+i) - y(x), \rho(i)) \tag{4}$$

to modify the filtering of the input signal y with a 2D-filter f at sample local x wherein 'Clip' is the clipping function defined by Clip(d; b)=min(b; max(−b; d)) and ρ(i) are trained clipping parameters used for the filtering process $y*f_k$ and for a first convolutional layer of a CNN of the soft classification.

2.2 2nd Filtering

Some or all parameters in (2) may be stored and used independent of the input data y to be filtered. In order to better adapt to specific signal characteristics, according to embodiments an additional filtering process may be introduced, now with adaptive filters $\tilde{f}_k$ that are transmitted in the bit-stream and are optimized at the encoder, e.g., for each input frame. This additional 2nd filtering step may be performed after filtering with the $f_k$ and may be defined as $$\hat{y} = y + \sum_{k=1}^{L} \tilde{f}_k * (\phi_k(y \mid \Theta) \cdot (y * f_k)) \tag{5}$$

The filters $\tilde{f}_k$ may be symmetric and e.g., of 7×7 diamond-shape. Thus, a number of 13 coefficients $\tilde{c}_0, \ldots, \tilde{c}_{12}$ may be needed to be signalled for each $\tilde{f}_k$ with k=1, . . . ; L. The coefficients $\tilde{c}_i$ may be computed such that the mean squared error between the target frame and the filtered reconstructed frame is minimized. To save signalling costs, similar as for ALF, a merging algorithm may be applied to reduce the number of filters $\tilde{f}_k$. It is pointed out that introducing the 2nd filtering stage and transmitting the coefficients $\tilde{f}_k$ appeared to be more beneficial than to transmit the coefficients of the filters $f_k$, although doing the latter would be more aligned with the design of ALF.

That is, according to an embodiment, coefficients of filters of the ALF are received as part of the bitstream.

According to an embodiment, filters of the ALF comprise a 2D 7×7 diamond shape.

According to an embodiment, the ALF comprises the CNN to implement at least a part of the soft classification, the CNN being adapted for a two stage filtering based on formula (5), i.e., $$\hat{y} = y + \sum_{k=1}^{L} \tilde{f}_k * (\phi_k(y \mid \Theta) \cdot (y * f_k)) \tag{5}$$

wherein $\hat{y}$ is a result of the adaptive in-loop filtering; y is a reconstructed frame prior to in-loop filtering; L is a number of classes into which the classes are classified; $\Phi_1, \ldots, \Phi_L$ define the classification outputs, $f_k$ is the first stage FIR filter associated with class k, $\hat{f}_k$ is the second stage FIR filter associated with class k ⊖ defining the weights of a at least one, of some or all layers of the CNN.

According to an embodiment, the decoding apparatus 10 may be configured for receiving, the parameters of FIR filters, e.g., filter weights and/or a size or shape thereof as part of the bitstream.

3. Complexity Analysis

In this section, the complexity of CNN in-loop filter in (5) comprising or consisting of CNN classifier and filtering process is analysed by the number of multiplications per sample. From the table of FIG. 3, it may be seen that the total number of multiplications per sample for CNN classifier may be given, in accordance with the presented embodiment, by 11302. The filtering process may comprise or consists of two parts, the first filtering with $f_k$ and the second filtering with $\tilde{f}_k$. For the first 2D filters $f_k$, 7×7 filters may be selected while 7×7 symmetric diamond-shaped filters $\tilde{f}_k$ with 13 tab filter coefficients for the second filtering process. This may require $25\cdot(7^2+13)=1550$ multiplications per sample. Therefore, the total number of multiplication per sample for all convolutional layers may be given by $$11302+1550=12852.$$

The total number of trained parameters may equal 29873, where each parameter may be stored in 32-bit-precision.

This corresponds to a memory requirement of 129.036 KB and a worst case complexity of 12.852 kMAC/luma-pixel, the latter being reached if each sample of a sequence is filtered with the proposed in-loop filter.

According to an embodiment, the soft classification is adapted to execute, for classifying the reconstructed samples, a total number of multiplications per sample that is at most 15000, e.g., 11302. According to an embodiment, the soft classification is adapted to execute a number of at most 2000, e.g., 1550 multiplications per sample for implementing a first filtering and a second filtering. According to an embodiment, the soft classification is adapted to provide for a number of at most 35000, e.g., 29873 trained parameters.

According to an embodiment the decoding apparatus 10 is a VVC decoder.

Figure 4:
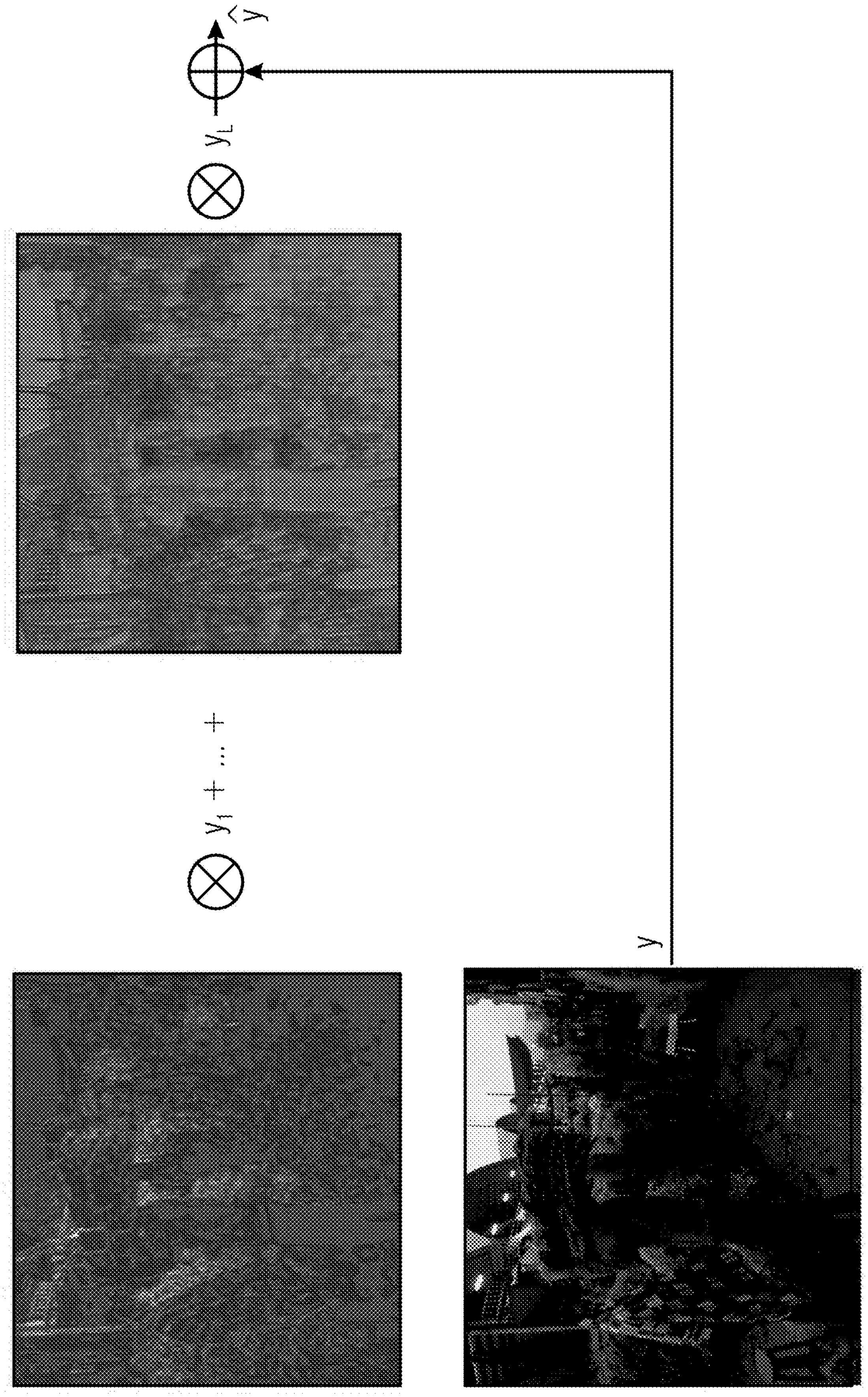
FIG. 4 shows a schematic representation to illustrate a CNN in-loop filter according to an embodiment.

FIG. 4 shows a schematic representation to illustrate the CNN in-loop filter in (2) using the example of $y_k=(y*f_k)$ where * is a convolution.

Experimental Results

In this section, example simulation results are presented for the proposed in-loop filter. For this, two models for CNN in-loop filter are trained based on BVI-DVC data set [22] where only the luma-components of the signals are used for training. The raw video data was compressed by VVC VTM 13.0 under RA configuration with ALF switched with sequence-QP in the set {22; 27; 32; 37; 42}. The first model is trained on I frames while the 2nd model is trained on B frames. During training, the Adam optimization [23] with the mean squared error loss function is used. Moreover, the batch-size is set to 64, where each batch is formed by randomly selected 64×64-blocks in the original sequences and the corresponding blocks in the reconstructed frames, where the latter are extended to size 80×80 in order to mitigate padding effects. After training, the CNN in-loop filter is integrated in the VVC test model version VTM 13.0 so that the first and second models can be applied for I frames and B frames respectively. Which of the models is to be applied or whether the original ALF is to be applied is signalled on a frame-level and decided by an RD-decision at the encoder.

If a CNN-model is applied, it can be switched on and off on a CTU-level where the switch is signalled. Moreover, it is also signalled on a CTU-level whether additionally the 2nd filtering from (5) is to be applied or not. For the 2nd-filtering, the filter coefficients of the $\tilde{f}_k$ are signalled per frame. They are determined at the encoder by conducting an RD-search that is similar to the determination of the filter coefficients in the ALF-encoder of VTM. The CNN-based in-loop filter proposed in this paper is applied to the luma component only. For the chroma component, the in-loop filters of VVC may be kept unchanged, including ALF for chroma and Cross-Component ALF (CCALF) [11].

The tables shown in FIG. 5 and FIG. 6 show the BD-rate saving and codec complexity of the presented method over the VVC reference software VTM 13.0 under AI and RA configurations respectively. Whilst the table of FIG. 5 shows a rate-distortion performance comparison with VTM 13.0 in AI, the table of FIG. 6 shows a rate-distortion performance comparison with VTM 13.0 in RA. The encoder and decoder average runtime ratios over all sequences between test and anchor are provided. All experimental results are conducted using the CTC from JVET [24] for AI and RA configurations with two sets of QP values, {22; 27; 32; 37} (low QP) and {27; 32; 37; 42} (high QP).

In connection with the described embodiments, a novel data-driven extension of ALF is proposed and implemented. The resulting in-loop filtering is still conducted by a classification step followed by an FIR-filtering. For the classification step, a soft classification such as a CNN is used. Experimental results show that on average, 3.85%/4.75% (low/high-QP) and 4.39%/4.33% (low/high-QP) bit-rate reduction (for luma) can be obtained under AI and RA configurations respectively. Compared to other approaches from CNN-based in-loop filtering, the required number of multiplications per sample can be reduced. For instance, other existing CNN in-loop filtering methods such as [13, 14, 15, 16] all provide significant bit-rate reduction over VVC, namely 6.54%/2.81% (AI/RA, compared with VVC VTM 4.0 [13]), 2.9%/3.6% (AI/RA, compared with HEVC+ALF [14]), 8.9% (AI, compared with HEVC [15]) and 4.6% (RA, compared with VVC VTM 7.0 [16]). However, they all require higher complexity compared with the embodied approach—about $1.0\times10^5$, $3.6\times10^5$, $1.7\times10^5$ and $7.0\times1.0^6$ for the number of multiplications per sample respectively. Finally, one may consider that significant high decoder-runtime from the embodied results is due to a non-optimized implementations that is not using any customized library for the fast execution of CNNs. Such a library may be used to enhance the decoder-runtime.

The described embodiments allow for a novel data-driven generalization of the adaptive in-loop filter (ALF) of Versatile Video Coding (VVC). The underlying description shows how the conventional ALF process of classification and FIR filtering can be generalized to define a natural model architecture for convolutional neural network (CNN) based in-loop filters. Experimental results show that over VVC, average bit-rate savings of 3.85%/4.75% and 4.39%/4.33% can be achieved for the all intra and random access configurations in the low- and high-QP settings. Compared to other CNN-based in-loop filters, the complexity measured in number of multiplications per sample is significantly reduced.

Encoder

With regard to the features described above, a suitable encoder is also an embodiment of the present invention. An apparatus for encoding a picture to a binary representation of the picture is configured for receiving a frame associated with a digital representation of a picture; for deriving samples from the frame; for classifying the reconstructed samples for an adaptive in-loop filtering, ALF, using a convolutional neural network, CNN; and for providing a bitstream such as bitstream 12 allowing to reconstruct the samples.

According to an embodiment, the adaptive in-loop-filtering is based on adaptive filters $\tilde{f}_k$, wherein the encoder is adapted to transmit filter coefficients of the adaptive filters in the bitstream.

According to an embodiment, the apparatus is configured for determining coefficients of the adaptive filter such that the mean squared error between the reconstructed frame and the filtered reconstructed frame is minimized.

According to an embodiment, filters of the ALF comprise a 2D 7×7 diamond shape.

Encoder and decoder may comprise respective features and functionality that is related to one another. This may include respective similar features, e.g., with regard to filters being used but may also include an inverted functionality related to encoding/decoding.

Decoder

Further advantageous implementations if the underlying invention also relate to an decoder side.

According to an embodiment, an apparatus for decoding a picture from a binary representation of the frame is presented, wherein the apparatus is configured for reconstructing, based on the binary representation, samples of the frame; and classifying the reconstructed samples using a soft classification to obtain classified samples. The apparatus is configured for filtering the classified samples using an FIR filter.

In the following reference is made to a basic architecture of a loop-filter to be used, e.g., in a decoder according to an embodiment.

According to a first embodiment, a finite impulse response (FIR) filtering with a soft classifier may be implemented in a decoder.

In such a decoder, for which a mapping may be applied, which, out of the reconstructed frame y and optionally some other inputs assigns to each sample position i in the reconstructed frame values_$\Phi_i(i;y), \ldots, \Phi_N(i;y)$ such that for some sample position $i_0$, at least two values_$\Phi_k(i_0;y)$, $\Phi_l(i_0;y)$, $1 \le k, l \le N$ satisfy $\Phi_k(i_0;y) \neq 0$ and _$\Phi_l(i_0;y) \neq 0$ and such that the _final reconstructed frame f is generated by the decoder, whose sample value $\hat{y}(i)$ at sample-position i is based on or given by the formula $$\hat{y}(i) = \sum_{j=1}^{N} \Phi_j(i) \cdot (f_j * y)(i) \tag{6}$$

wherein each $f_j$ is an FIR-filter and * denotes a convolution.

According to an embodiment, such a decoder may be adjusted in a way that the coefficients of the filters $f_j$ are decoded per frame or per sequence or per other unit from the bit-stream. According to an embodiment that may be implemented in addition or as an alternative such a decoder may be adjusted in a way that parameters of the function $\phi$ are decoded per frame or per sequence or per other unit from the bit-stream.

According to a second embodiment, a finite impulse response (FIR) filtering with a soft classifier and an additional second filtering may be implemented in a decoder.

In such a decoder, for which a mapping may be applied, which, out of the reconstructed frame y and optionally some other inputs assigns to each sample position i in the reconstructed frame values _$\Phi_i(i;y), \ldots, \Phi_N(i;y)$, FIR-filters $f_j$, j=1; . . . ; N, such that for j=1, . . . , N, intermediate reconstructed frames $z_j$ are generated by the decoder using the classification outputs $\Phi_1, \ldots, \Phi_N$ and which at each sample position i take the sample value $$z_j(i) = \Phi_j(i) \cdot (f_j * y)(i) \tag{7}$$

FIR filters $g_j$, j=1, . . . , N, such that the final reconstructed frame f is generated by the decoder whose sample value $\hat{y}(i)$ at sample-position i is based on or given according to the rule $$\hat{y}(i) = \sum_{j=1}^{N} (g_j * z_j)(i) \tag{8}$$

wherein $f_j$ are FIR filters used for class j, * denotes a convolution. Parameter N described herein may correspond to parameter L.

According to an embodiment, such a decoder may be configured that the coefficients of the filters $g_j$ are decoded per frame or per sequence or per other unit from the bit-stream. Alternatively or in addition, the decoder may be configured that the coefficients of the filters $f_j$ are decoded per frame or per sequence or per other unit from the bit-stream. Alternatively or in addition, the decoder may be configured that some parameters of the function $\phi$ are decoded per frame or per sequence of per other unit from the bit-stream.

That is, decoder-related embodiments relate to signaling of coefficients of the loop filters having a basic architecture that is described in formulas (6), (7) and (8), i.e., in one or both decoder implementations. Embodiments relate to a FIR_filtering with soft classifier and signalling of the filter coefficients. For example, the coefficients of the filters $g_j$ and/or fj are decoded per frame or per sequence or per other unit from the bit-stream.

Some decoder-related embodiments of the present invention refer to a decoder that is configured for decoding a flag per sequence or per frame or per block which determines whether to apply a modification of the reconstructed samples on that block according to equation (6) or not.

Such a decoder may decode a flag per sequence or per frame or per block which determines whether to apply a modification of the reconstructed samples on that block according to $$\hat{y}(i) = \sum_{j=1}^{N} \Phi_j(i) \cdot (f_j * y)(i) \tag{6}$$

or not. This may be referred to as a frame-, block-level flag for first loop-filter on/off.

Some decoder-related embodiments of the present invention refer to a decoder that is configured to decode a flag per sequence or per frame or per block which determines whether to apply a modification of the reconstructed samples on that block according to equation (8) or not.

Such a decoder that may be configured for decoding a flag per sequence or per frame or per block which determines whether to apply a modification of the reconstructed samples on that block according to $$\hat{y}(i) = \sum_{j=1}^{N} (g_j * z_j)(i) \tag{8}$$

or not. This may be referred to as a frame-, block-level flag for second loop-filter on/off.

Such decoding of a flag may be referred to as switches that re related to the loop filters described herein and that have one of the basic architectures. The decoding of the flag may allow for a high quality of a decoding result at a same time with saving unrequired computational power.

Beside decoding a flag that indicates whether to apply a modification according to formula (6) or not on the one hand and whether to apply a modification according to formula (8) or not on the other hand as described above, embodiments that may be implemented as an alternative or in addition may relate to a decision whether and/or which of the modifications to apply. This may be referred to as a frame-, block-level flag for switching between first and second loop-filter.

For example, a decoder that is configured to decode a flag per frame or per block which determines whether a modification of the reconstructed samples on that block according to $$\hat{y}(i) = \sum_{j=1}^{N} \Phi_j(i) \cdot (f_j * y)(i) \tag{6}$$

or according to $$\hat{y}(i) = \sum_{j=1}^{N} (g_j * z_j)(i)$$

is to be applied.

This may optionally include to decode information to apply none of the above.

Embodiments also provide for a decoder for which multiple loop filters according to $$\hat{y}(i) = \sum_{j=1}^{N} \Phi_j(i) \cdot (f_j * y)(i) \tag{6}$$

are applicable. Such a decoder is, according to an embodiment, configured to decode per frame or per block an index determining which of these multiple loop filters is applied for the given frame/block, e.g., if the functions ϕ of the multiple applicable loop filters are realized by a convolutional neural network, CNN, they may share some weights for some layers but differ in other weights/layers. This may be referred to as a frame-, block-level switching for switching between different configurations of the first loop-filter as presented in formula (6).

As an alternative or in addition, such a switching between configurations may be applied to the second configuration as presented in formula (8).

Such a decoder may be configured in a way that multiple loop filters according to $$\hat{y}(i) = \sum_{j=1}^{N} (g_j * z_j)(i) \tag{8}$$

are applicable. The decoder may decode per frame or per block an index determining which of these multiple loop filters is applied for the given frame/block; wherein some of these multiple loop filters may be equal in some parameters that describe the function ϕ, e.g., if the functions ϕ of the multiple applicable loop filters are realized by a convolutional neural network, CNN, they may share some weights for some layers but differ in other weights/layers. This may be referred to as a frame-, block-level switching for switching between different configurations of the second loop-filter as presented in formula (8).

It is to be noted that a decoder in accordance with embodiments may relate to either apply the first structure related to formula (6) or the second structure related to formula (8). As described above, also a combination thereof may be realized in a decoder, e.g., benefiting from a switch between both modes. Thus, also the described advantageous modifications may be implemented individually or without a different modification or may be implemented in any combination.

Further embodiments, implementable individually or in combination relate to doing in loop filters having the basic architecture of formula (6) and (or (8) for luma while doing normal ALF/CCALF for chroma, i.e., to treat luma and chroma differently.

A decoder in accordance with said recognition is adapted to perform a loop filtering process according to $$\hat{y}(i) = \sum_{j=1}^{N} \Phi_j(i) \cdot (f_j * y)(i) \tag{6}$$

to the luma-component only, while a second loop filtering process that is processed independently or dependent from said loop filtering process is applied to the chroma components. In other words, a decoder is presented where a loop filtering process according to (6) is applied to the luma-component only, while a second loop filtering process that can be processed together or independently from the loop filtering process according to (6) is applied to the chroma components, e.g., the first loop filtering for luma and a normal ALF/CCALF for chroma.

As an alternative implementation or as an alternative operation mode or even in addition, a decoder in accordance with an embodiment may be configured for a loop filtering process according to $$\hat{y}(i) = \sum_{j=1}^{N} (g_j * z_j)(i) \tag{8}$$

to the luma-component only, while a second loop filtering process that is processed independently or dependent from said loop filtering process is applied to the chroma components. In other words, a decoder is presented where an loop filtering process according to (8) is applied to the luma-component only, while a second loop filtering process that can be processed together or independently from the loop filtering process according to (8) is applied to the chroma components, e.g., the second loop filtering for luma and a normal ALF/CCALF for chroma.

Those configurations may also be implemented in an encoder according to an embodiment. For example, with regard to the first loop filter of formula (6), an encoder may encode a frame using a loop filter described by (6) for at least some parts of the frame. A further encoder that also solves a linear equation in order to determine coefficients of the filters $f_k$ that may correspond to filters $f_j$ and a further encoder that also conducts an Rate Distortion RD-search to merge some coefficients of the filters $f_k/f_j$ and to determine the optimal flags, switches and further parameters for a decoder that operates according to an embodiment described herein.

Such an encoder encodes a frame using a loop filter according to $$\hat{y}(i) = \sum_{j=1}^{N} \Phi_j(i) \cdot (f_j * y)(i) \tag{6}$$

for at least some parts of the frame.

According to an embodiment, such an encoder according may be configured for solving a linear equation in order to determine coefficients of the filters $f_j$.

According to an embodiment, such an encoder may be configured for conducting an RD-search to merge some coefficients of the $f_j$ and to determine the optimal flags, switches and further parameters for a decoder that operates according to the aspects described herein.

A Corresponding encoder is defined by embodiments for the second filtering of formula (8).

Such an encoder encodes a frame using a loop filter described by $$\hat{y}(i) = \sum_{j=1}^{N} (g_j * z_j)(i) \tag{8}$$

for at least some parts of the frame.

According to an embodiment, such an encoder may be configured for solving linear equations in order to determine coefficients of the filters $f_j$ or the filters $g_j$.

According to an embodiment, such an encoder may be configured for conducting an RD-search to merge some coefficients of the $f_j$ or the $g_j$ and to determine the optimal flags, switches and further parameters for a decoder that operates according to the aspects described herein.

It is to be noted, that such encoders as defined by formulas (6) through (8) that relate to a parameter j relate, at a same time to a parameter k in formulas (1) through (5) above. That is, the index j may correspond to the index k. Further, parameter N described herein may correspond to parameter L.

Further embodiments relate to methods to operate an apparatus an encoder or a decoder being described herein. Further embodiments relate to a computer readable digital storage medium having stored thereon a computer program having a program code for performing, when running on a computer, a method described herein.

Further embodiments relate to a bitstream generated by an encoder or encoding apparatus described herein; and/or received by a decoder or decoding apparatus described herein.

In the following, additional embodiments and aspects of the invention will be described which can be used individually or in combination with any of the features and functionalities and details described herein.

Aspect 1: An apparatus for decoding a picture from a binary representation of the picture, wherein the apparatus is configured for:

- reconstructing, based on the binary representation, samples of the picture; and
- classifying the reconstructed samples for an adaptive in-loop filtering, ALF, using a soft classification such as a convolutional neural network, CNN.

Aspect 2: The apparatus of aspect 1, wherein the apparatus is configured for enhancing functionality of a H.266 or VVC decoder.

Aspect 3: The apparatus of aspect 1 or 2, wherein the soft classification is configured for classifying the samples into a number of classes and to applying an associated filter to each of the classes, wherein each sample is associated with at least one class.

Aspect 4: The apparatus of aspect 3, wherein the associated filters are implemented, at least partly, as a finite impulse response, FIR, filter.

Aspect 5: The apparatus of aspect 3 or 4, wherein the ALF is implemented according to:

$$\hat{y} = y + \sum_{k=1}^{L} \chi C_k \cdot (y * f_k).$$

wherein $\hat{y}$ is a result of the adaptive in-loop filtering; y is a reconstructed frame prior to in-loop filtering; L is a number of classes into which the classes are classified; $\chi C_k$ is the characteristic function of class C having index k and $f_k$ is the FIR filter associated with class k; wherein the soft classification is implemented to provide for a substitution of the characteristic function.

Aspect 6: The apparatus of one of previous aspects, wherein the soft classification is implemented at least in parts by a CNN that comprises a convolution layer and a first to seventh basic layer group.

Aspect 7: The apparatus of aspect 6, wherein the CNN comprises exactly one convolution layer and exactly 7 basic layer groups.

Aspect 8: The apparatus of aspect 7, wherein a structure of the CNN is based on:

| layer | size | type | # (mul) |
|---|---|---|---|
| conv layer | (7, 7, 1, 4) | NS | 196 |
| 1st basic layer group | (3, 3, 8, 32) | NS | 2304 |
| 2nd basic layer group | (3, 3, 32, 64) | DS | 2336 |
| 3rd basic layer group | (3, 3, 64, 64) | DS | 4672/4 |
| 4th basic layer group | (3, 3, 64, 64) | DS | 4672/4 |
| 5th basic layer group | (3, 3, 64, 128) | DS | 8768/4 |
| 6th basic layer group | (3, 3, 128, 25) | DS | 4352/4 |
| 7th basic layer group | (3, 3, 25, 25) | DS | 850 |

wherein a size (a, b, c, d) refers to kernel kernel sizes a and b, a number of input channels c and a number of output channels d; wherein a type of the layer indicates a type of convolution as non-separable, NS; or depth-wise separable, DS; and wherein #(mul) indicates a number of multiplications of the layer.

Aspect 9: The apparatus of one of previous aspects, wherein the ALF comprising the CNN to implement at least a part of the soft classification, the CNN being based on:

$$\hat{y} = y + \sum_{k=1}^{L} \phi_k(y \mid \Theta) \cdot (y * f_k).$$

wherein ŷ is a result of the adaptive in-loop filtering; y is a reconstructed frame prior to in-loop filtering; L is a number of classes into which the classes are classified; $\Phi_1, \ldots, \Phi_L$ define the classification outputs and $f_k$ is the FIR filter associated with class k, $\ominus$ defining the weights of a at least one, of some or all layers of the CNN.

Aspect 10: The apparatus of one of previous aspects, wherein the apparatus is configured to implement the soft classification by convoluting, batch-normalizing implementing a rectified linear (ReLU) activation function.

Aspect 11: The apparatus of one of previous aspects, wherein the apparatus is configured to implement the soft classification by use of a CNN that is adapted to use, for classifying the reconstructed samples of a frame, at least one of:

- a quantization parameter, QP, information, e.g., a QP parameter plane;
- a reconstructed version of the frame prior to a deblocking filter, DBF; and
- a prediction signal from an inter or intra prediction based on the frame.

Aspect 12: The apparatus of one of previous aspects, wherein a $1^{st}$ basic layer group of a CNN of the soft classification is adapted to receive 8 input channels, preferably exactly 8 input channels.

Aspect 13: The apparatus of aspect 12, wherein the 8 input channels comprise:

- a quantization parameter, QP, information, e.g., a QP parameter plane;
- a reconstructed version of the frame prior to a deblocking filter, DBF; and
- a prediction signal from an inter or intra prediction based on the frame.
- four output channels of a convolutional layer connected to the $1^{st}$ basic layer; and
- the reconstructed input frame.

Aspect 14: The apparatus of one of previous aspects, wherein the soft classification is to identify dominant features around a sample location.

Aspect 15: The apparatus of one of previous aspects, wherein the soft classification comprises a subsampler for providing a subsampling operator.

Aspect 16: The apparatus of aspect 15, wherein, for implementing the subsampling operator, the soft classification comprises a CNN that comprises a max pooling operator with 3×3 window followed by a 2DN downsampling with factor 2 that is applied to output channels of a second basic layer group of the CNN; wherein in a last last layer of the CNN, the downsampling step is reverted by an upsampling with trained upsampling filters.

Aspect 17: The apparatus of one of previous aspects, wherein the soft classification is configured for a depth-wise separable convolution.

Aspect 18: The apparatus of aspect 17, wherein the depth-wise separable convolution comprises a filtering process in two parts; wherein a first part comprises a 2D convolution with a $k_1 \times k_2$ kernel that is performed independently over each input channel of the soft classification; wherein a second part comprises a full convolution but with 1×1 kernels that is applied across all channels.

Aspect 19: The apparatus of one of previous aspects, wherein the soft classification is adapted for applying a softmax function to a output channels of a last, e.g. seventh, basic layer group of the soft classification.

Aspect 20: The apparatus of one of previous aspects, wherein the softmax function comprises a structure based on $$\phi_k(i) = \frac{\exp(\psi_k(i))}{\sum_{\ell=1}^{L} \exp(\psi_\ell(i))} \text{ for } i \in I.$$

wherein $\Phi_k(i)$ is intpretable as an estimated probability that the corresponding sample location $i \in I$ is associated with a class of index k; $\Phi_k$ is a classification output; and $\psi_l$ are the output channels of the last basic layer group.

Aspect 21: The apparatus of one of previous aspects, wherein the ALF is adapted for applying multiple 2D filters ($f_k$) for different classes k to the classified samples.

Aspect 22: The apparatus of one of previous aspects, wherein the ALF is adapted for filtering the classified samples with a clipping function to reduce the impact of neighbor sample values when they are too different with the current sample value being filtered.

Aspect 23: The apparatus of one of previous aspects, wherein the clipping function is based on the determination rule $$\sum_{i \neq (0,0)} f(i) \text{Clip}(y(x+i) - y(x), \rho(i))$$

to modify the filtering of the input signal y with a 2D-filter f at sample local x wherein 'Clip' is the clipping function defined by Clip(d; b)=min(b; max(−b; d)) and ρ(i) are trained clipping parameters used for the filtering process $y*f_k$ and for a first convolutional layer of a CNN of the soft classification.

Aspect 24: The apparatus of one of previous aspects, wherein coefficients of filters of the ALF are received as part of the bitstream.

Aspect 25: The apparatus of one of previous aspects, wherein filters of the ALF comprise a 2D 7×7 diamond shape.

Aspect 26: The apparatus of one of previous aspects, wherein the ALF comprises the CNN to implement at least a part of the soft classification, the CNN being adapted for a two stage filtering based on:

$$\hat{y} = y + \sum_{k=1}^{L} \hat{f}_k * (\phi_k(y \mid \Theta) \cdot (y * f_k))$$

wherein ŷ is a result of the adaptive in-loop filtering; y is a reconstructed frame prior to in-loop filtering; L is a number of classes into which the classes are classified; $\Phi_1, \ldots, \Phi_L$ define the classification outputs, $f_k$ is the first stage FIR filter associated with class k, $\hat{f}_k$ is the second stage FIR filter associated with class k $\ominus$ defining the weights of a at least one, of some or all layers of the CNN.

Aspect 27: The apparatus of aspect 9 or 26, being configured for receiving, the parameters of FIR filters, e.g., filter weights and/or a size or shape thereof as part of the bitstream.

Aspect 28: The apparatus of one of previous aspects, wherein the soft classification is adapted to execute, for classifying the reconstructed samples, a total number of multiplications per sample that is at most 15000, e.g., 11302.

Aspect 29: The apparatus of aspect 28, wherein the soft classification is adapted to execute a number of at most 2000, e.g., 1550 multiplications per sample for implementing a first filtering and a second filtering.

Aspect 30: The apparatus of one of previous aspects, wherein the soft classification is adapted to provide for a number of at most 35000, e.g., 29873 trained parameters.

Aspect 31: The apparatus of one of previous aspects, being a VVC decoder.

Aspect 32: An apparatus for encoding a picture to a binary representation of the picture, wherein the apparatus is configured for:

receiving a frame associated with a digital representation of a picture;

deriving samples from the frame;

classifying the reconstructed samples for an adaptive in-loop filtering, ALF, using a convolutional neural network, CNN; and providing a bitstream allowing to reconstruct the samples.

Aspect 33: The apparatus of aspect 32, wherein the adaptive in-loop-filtering is based on adaptive adaptive filters $\tilde{f}_k$ wherein the encoder is adapted to transmit filter coefficients of the adaptive filters in the bitstream.

Aspect 34: The apparatus of aspect 32 or 33, wherein the apparatus is configured for determining coefficients of the adaptive filter such that the mean squared error between the reconstructed frame and the filtered reconstructed frame is minimized.

Aspect 35: The apparatus of one of aspects 32 to 34, wherein filters of the ALF comprise a 2D 7×7 diamond shape.

Aspect 36: An apparatus for decoding a picture from a binary representation of the frame, wherein the apparatus is configured for:

reconstructing, based on the binary representation, samples of the frame; and classifying the reconstructed samples using a soft classification to obtain classified samples; and filtering the classified samples using an FIR filter.

Aspect 37: The apparatus of aspect 36, wherein the soft classification comprises a mapping that, out of a reconstructed frame (y) providing the samples and optionally additional inputs assigns to each sample position (i) in the reconstructed frame values $\Phi_1(i; y), \ldots, \Phi_N(i; y)$ such that for a sample position $i_0$, at least two values $\Phi_k(i_0; y)$, $\Phi_l(i_0; y)$, $1 \leq k; l \leq N$ satisfy $\Phi_k(i_0; y) \neq 0$ and $\Phi_l(i_0; y) \neq 0$ and such that the final reconstructed frame $\hat{y}$ is generated by the decoder, whose sample value $\hat{y}(i)$ at sample-position i is given by the formula $$\hat{y}(i) = \sum_{j=1}^{N} \phi_j(i) \cdot (f_j \star y)(i),$$

where $f_j$ is an FIR filter used for class j,* denotes convolution and $\Phi_1, \ldots, \Phi_N$ define the classification outputs.

Aspect 38: A decoder according to aspect 37, wherein the coefficients of the filters $f_j$ are decoded per frame or per sequence or per other unit from the bit-stream.

Aspect 39: A decoder according to aspect 37 or 38, wherein some parameters of the function $\phi$ are decoded per frame or per sequence or per other unit from the bit-stream.

Aspect 40: The apparatus of aspect 36, wherein the soft classification comprises a mapping that, out of a reconstructed frame (y) providing the samples and optionally additional inputs assigns to each sample position (i) in the reconstructed frame values $\Phi_1(i; y), \ldots, \Phi_N(i; y)$ FIR filters $f_j$, j=1, . . . , N, such that for j=1, . . . , N, intermediate reconstructed frames $z_j$ are generated by the decoder which at each sample position I take the sample value $$z_j(i) = \phi_j(i) \cdot (f_j \star y)(i)$$

and FIR filters $g_j$, j=1, . . . , N such that the final reconstructed frame f is generated by the decoder, whose sample value $\hat{y}(i)$ at sample-position i is given by the formula $$\hat{y}(i) = \sum_{j=1}^{N} (g_j \star z_j)(i)$$

where $f_j$ and $g_j$ are FIR filters used for class j, * denotes convolution and $\Phi_1, \ldots, \Phi_N$ define the classification outputs.

Aspect 41: The decoder according to aspect 40, where the coefficients of the filters $g_j$ are decoded per frame or per sequence or per other unit from the bit-stream.

Aspect 42: The decoder according to aspect 40 or 41, where the coefficients of the filters $f_j$ are decoded per frame or per sequence or per other unit from the bit-stream.

Aspect 43: The decoder according to one of aspects 40 to 42, wherein some parameters of the function are decoded per frame or per sequence of per other unit from the bit-stream.

Aspect 44: A decoder that decodes a flag per sequence or per frame or per block which determines whether to apply a modification of the reconstructed samples on that block according to $$\hat{y}(i) = \sum_{j=1}^{N} \phi_j(i) \cdot (f_j \star y)(i),$$

or not.

Aspect 45: A decoder that decodes a flag per sequence or per frame or per block which determines whether to apply a modification of the reconstructed samples on that block according to $$\hat{y}(i) = \sum_{j=1}^{N} (g_j \star z_j)(i)$$

or not.

Aspect 46: A decoder that decodes a flag per frame or per block which determines whether a modification of the reconstructed samples on that block according to $$\hat{y}(i) = \sum_{j=1}^{N} \phi_j(i) \cdot (f_j \star y)(i),$$

or according to $$\hat{y}(i) = \sum_{j=1}^{N} (g_j \star z_j)(i)$$

is to be applied.

Aspect 47: A decoder for which multiple loop filters according to $$\hat{y}(i) = \sum_{j=1}^{N} \phi_j(i) \cdot (f_j \star y)(i),$$

are applicable and which decodes per frame or per block an index determining which of these multiple loop filters is applied for the given frame/block, e.g., if the functions ϕ of the multiple applicable loop filters are realized by a convolutional neural network, CNN, they may share some weights for some layers but differ in other weights/layers.

Aspect 48: A decoder for which multiple loop filters according to $$\hat{y}(i) = \sum_{j=1}^{N} (g_j \star z_j)(i)$$

are applicable and which decodes per frame or per block an index determining which of these multiple loop filters is applied for the given frame/block; wherein some of these multiple loop filters may be equal in some parameters that describe the function ϕ, e.g., if the functions ϕ of the multiple applicable loop filters are realized by a convolutional neural network, CNN, they may share some weights for some layers but differ in other weights/layers.

Aspect 49: A decoder where a loop filtering process according to $$\hat{y}(i) = \sum_{j=1}^{N} \phi_j(i) \cdot (f_j \star y)(i),$$

is applied to the luma-component only, while a second loop filtering process that is processed independently or dependent from said loop filtering process is applied to the chroma components.

Aspect 50: A decoder where a loop filtering process according to $$\hat{y}(i) = \sum_{j=1}^{N} (g_j \star z_j)(i)$$

is applied to the luma-component only, while a second loop filtering process that is processed independently or dependent from said loop filtering process is applied to the chroma components.

Aspect 51: An encoder that encodes a frame using a loop filter described by $$\hat{y}(i) = \sum_{j=1}^{N} \phi_j(i) \cdot (f_j \star y)(i),$$

for at least some parts of the frame.

Aspect 52: The encoder according to aspect 51 that is configured for solving a linear equation in order to determine coefficients of the filters $f_j$, wherein the index j may correspond to index k in aspects 1 to 35.

Aspect 53: The encoder according to aspect 51 or 52 that is configured for conducting an RD-search to merge some coefficients of the $f_i$ and to determine the optimal flags, switches and further parameters for a decoder that operates according to aspects 37, 39, 44 and 47, wherein the index j may correspond to index k in aspects 1 to 35.

Aspect 54: An encoder that encodes a frame using a loop filter described by $$\hat{y}(i) = \sum_{j=1}^{N} (g_j \star z_j)(i)$$

for at least some parts of the frame.

Aspect 55: The encoder of aspect 54, that is configured for solving linear equations in order to determine coefficients of the filters $f_j$ or the filters $g_j$, wherein the index j may correspond to index k in aspects 1 to 35.

Aspect 56: The encoder of aspect 54 or 55, configured for conducting an RD-search to merge some coefficients of the $f_j$ or the $g_j$ and to determine the optimal flags, switches and further parameters for a decoder that operates according to aspects 41, 42, 43, 45, 46, 48 or 50, wherein the index j may correspond to index k in aspects 1 to 35.

Aspect 57: A method for operating an apparatus for decoding a picture from a binary representation of the picture, the method comprising:

reconstructing, based on the binary representation, samples of the picture; and classifying the reconstructed samples for an adaptive in-loop filtering, ALF, using a soft classification such as a convolutional neural network, CNN.

Aspect 58: A method for operating an apparatus for encoding a picture to a binary representation of the picture, wherein the method comprising:

receiving a frame associated with a digital representation of a picture;

deriving samples from the frame;

classifying the reconstructed samples for an adaptive in-loop filtering, ALF, using a convolutional neural network, CNN; and providing a bitstream allowing to reconstruct the samples.

Aspect 59: A method for operating an apparatus for decoding a picture from a binary representation of the frame, wherein the method comprising:

reconstructing, based on the binary representation, samples of the frame; and classifying the reconstructed samples using a soft classification to obtain classified samples; and filtering the classified samples using an FIR filter.

Aspect 60: A method for operating a decoder, the method comprising:

decoding a flag per sequence or per frame or per block which determines whether to apply a modification of the reconstructed samples on that block according to $$\hat{y}(i) = \sum_{j=1}^{N} \phi_j(i) \cdot (f_j \star y)(i),$$

or not; and operating accordingly.

Aspect 61: A method for operating a decoder, the method comprising:

decoding a flag per sequence or per frame or per block which determines whether to apply a modification of the reconstructed samples on that block according to $$\hat{y}(i) = \sum_{j=1}^{N} (g_j \star z_j)(i)$$

or not; and operating accordingly.

Aspect 62: A method for operating a decoder, the method comprising:

decoding a flag per frame or per block which determines whether a modification of the reconstructed samples on that block according to $$\hat{y}(i) = \sum_{j=1}^{N} \phi_j(i) \cdot (f_j \star y)(i),$$

or according to $$\hat{y}(i) = \sum_{j=1}^{N} (g_j \star z_j)(i)$$

is to be applied; and operating accordingly.

Aspect 63: A method for operating a decoder for which multiple loop filters according to $$\hat{y}(i) = \sum_{j=1}^{N} \phi_j(i) \cdot (f_j \star y)(i),$$

are applicable, the method comprising:

decoding per frame or per block an index determining which of these multiple loop filters is applied for the given frame/block, e.g., if the functions ϕ of the multiple applicable loop filters are realized by a convolutional neural network, CNN, they may share some weights for some layers but differ in other weights/layers; and operating accordingly.

Aspect 64: A method for operating a decoder for which multiple loop filters according to $$\hat{y}(i) = \sum_{j=1}^{N} (g_j \star z_j)(i)$$

are applicable, the method comprising:

decoding per frame or per block an index determining which of these multiple loop filters is applied for the given frame/block; wherein some of these multiple loop filters may be equal in some parameters that describe the function ϕ, e.g., if the functions ϕ of the multiple applicable loop filters are realized by a convolutional neural network, CNN, they may share some weights for some layers but differ in other weights/layers.

Aspect 65: A method for operating a decoder, the method comprising:

applying a loop filtering process according to $$\hat{y}(i) = \sum_{j=1}^{N} \phi_j(i) \cdot (f_j \star y)(i),$$

to a luma-component of a picture or frame to be decoded only; and applying a second loop filtering process that is processed independently or dependent from said loop filtering process to chroma components of the picture or frame.

Aspect 66: A method for operating a decoder, the method comprising:

applying a loop filtering process according to $$\hat{y}(i) = \sum_{j=1}^{N} (g_j \star z_j)(i)$$

to a luma-component of a picture or frame to be decoded only, and applying a second loop filtering process that is processed independently or dependent from said loop filtering process to chroma components of the picture or frame.

Aspect 67: A method for operating an encoder, the method comprising:

encoding a frame using a loop filter described by $$\hat{y}(i) = \sum_{j=1}^{N} \phi_j(i) \cdot (f_j \star y)(i),$$

for at least some parts of the frame.

Aspect 68: A method for operating an encoder, the method comprising:

encoding a frame using a loop filter described by $$\hat{y}(i) = \sum_{j=1}^{N} \phi_j(i) \cdot (f_j \star y)(i),$$

for at least some parts of the frame.

Aspect 69: A computer readable digital storage medium having stored thereon a computer program having a program code for performing, when running on a computer, a method according to one of aspects 57 to 68.

Aspect 70: A bitstream generated by an encoder or encoding apparatus of one of previous aspects; or received by a decoder or decoding apparatus according to one of previous aspects.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive binary representation can be stored on a digital storage medium or can be transmitted on a transmission medium such as a wireless transmission medium or a wired transmission medium such as the Internet.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

REFERENCES

[1] ITU-T and ISO/IEC "Advanced Video Coding for Generic Audiovisual Services" H.264 and ISO/IEC 14496-10, vers. 1, 2003

[2] T. Wiegand, G. J. Sullivan, G. Bjontegaard and A. Luthra, "Overview of the H.264/AVC video coding standard," IEEE Trans. Circuits Syst. Video Technol., vol. 13, pp. 560-576, 2003.

[3] ITU-T and ISO/IEC "High Efficiency Video Coding" H.265 and ISO/IEC 23008-2, vers. 1, 2013

[4] G. J. Sullivan, J.-R. Ohm, W.-J. Han and T. Wiegand, "Overview of the high efficiency video coding (HEVC) standard," IEEE Trans. Circuits Syst. Video Technol., vol. 22, pp. 1649-1668, 2012.
[5] ITU-T and ISO/IEC "Versatile Video Coding" H.266 and ISO/IEC 23090-3, 2020
[6] B. Bross et al. "Overview of the Versatile Video Coding (VVC) Standard and its Applications," IEEE Trans. Circuits Syst. Video Technol., vol. 31, pp. 3736-3764, 2021.
[7] P. List, A. Joch, J. Lainema, G. Bjontegaard and M. Karczewicz, "Adaptive deblocking filter," IEEE Trans. Circuits Syst. Video Technol., vol. 13, pp. 614-619, 2003.
[8] C.-M. Fu et al., "Sample adaptive offset in the HEVC standard," IEEE Trans. Circuits Syst. Video Technol., vol. 22, pp. 1755-1764, 2012.
[9] Tsai, C.-Y. et al., "Adaptive loop filtering for video coding," IEEE Journal of Selected Topics in Signal Processing, vol. 7, pp. 934-945, 2013.
[10] M. Karczewicz, L. Zhang, W. Chien and X. Li, "Geometry transformation-based adaptive in-loop filter," in Proc. Picture Coding Symposium (PCS), pp. 1-5, 2016.
[11] M. Karczewicz et al., "VVC In-Loop Filters," IEEE Trans. Circuits Syst. Video Technol., vol. 31, pp. 3907-3925, 2021.
[12] W.-J. Chien et al., "JVET AHG report: Tool reporting procedure and testing (AHG13)," 17th JVET meeting, no. JVET-Q0013. 2020.
[13] W. Jia, L. Li, Z. Li, X. Zhang and S. Liu, "Residual Guided Deblocking With Deep Learning," in 2020 IEEE International Conference on Image Processing (ICIP), IEEE, 2020, pp. 3109-3113.
[14] C. Jia et al., "Content-Aware Convolutional Neural Network for In-Loop Filtering in High Efficiency Video Coding," IEEE Transactions on Image Processing, vol. 28, pp. 3343-3356, July 2019.
[15] M.-Z. Wang, S. Wan, H. Gong and M.-Y. Ma, "Attention-Based Dual-Scale CNN In-Loop Filter for Versatile Video Coding," IEEE Access, vol. 7, pp. 145214-145226, 2019.
[16] D. Ma, F. Zhang and D. R. Bull, "MFRNet: A New CNN Architecture for Post-Processing and In-loop Filtering," IEEE Journal of Selected Topics in Signal Processing, vol. 15, pp. 378-387, 2021.
[17] S. Ioffe and C. Szegedy, "Batch normalization: Accelerating deep network training by reducing internal covariate shift," in International Conference on Machine Learning (ICML), 2015, pp. 448-456.
[18] V. Nair and G. E. Hinton, "Rectified linear units improve restricted Boltzmann machines," in Proc. 27th Int. Conf. Mach. Learn. (ICML), 2010, pp. 807-814.
[19] A. Howard et. al., "Mobilenets: Efficient convolutional neural networks for mobile vision applications," CVPR, 2017.
[20] I. Goodfellow, Y. Bengio and A. Courville, "Batch normalization: Accelerating deep network training by reducing internal covariate shift," in Deep Learning, MIT Press., 2016, pp. 180-184.
[21] J. Taquet, C. Gisquet, G. Laroche, P. Onno, "Non-Linear Adaptive Loop Filter," in 13th JVET meeting, no. JVETM0385, January 2019.
[22] D. Ma, F. Zhang and D. R. Bull, "BVI-DVC: a training database for deep video compression," in arXiv: 2003.13552, 2020.
[23] D. P. Kingma and J. Ba., "Adam: A method for stochastic optimization," nt. Conf. Learn. Represent. (ICLR), pp. 1-15, 2015.
[24] K. Suehring and X. Li, "JVET common test conditions and software reference configurations," in 2nd JVET meeting, no. JVET-B1010, February 2016.

The invention claimed is:

1. An apparatus for decoding a picture from a binary representation of the picture, wherein the apparatus is configured for:

reconstructing, based on the binary representation, samples of the picture; and classifying the reconstructed samples into multiple classes and for an adaptive in-loop filtering, ALF, using a soft classification of a convolutional neural network, CNN;

wherein the ALF is configured for computing a weighted sum of FIR-filtered versions of the reconstructed samples, wherein weighting factors of the weighted sum are sample-adaptive and are determined by the CNN.

2. The apparatus of claim 1, wherein the apparatus is configured for enhancing functionality of a H.266 or VVC decoder.

3. The apparatus of claim 1, wherein the soft classification is configured for classifying the samples into a number of classes and to applying an associated filter to each of the classes, wherein each sample is associated with at least one class.

4. The apparatus of claim 3, wherein the associated filters are implemented, at least partly, as a finite impulse response, FIR, filter.

5. The apparatus of claim 3, wherein the ALF is implemented according to:

$$\hat{y} = y + \sum_{k=1}^{L} \chi C_k \cdot (y * f_k)$$

wherein $\hat{y}$ is a result of the adaptive in-loop filtering; y is a reconstructed frame prior to in-loop filtering; L is a number of classes into which the classes are classified; $\chi C_k$ is the characteristic function of class C having index k and $f_k$ is the FIR filter associated with class k;

wherein the soft classification is implemented to provide for a substitution of the characteristic function.

6. The apparatus of claim 1, wherein the soft classification is implemented at least in parts by a CNN that comprises a convolution layer and a first to seventh basic layer group.

7. The apparatus of claim 6, wherein the CNN comprises exactly one convolution layer and exactly 7 basic layer groups.

8. The apparatus of claim 7, wherein a structure of the CNN is based on:

| layer | size | type | # (mul) |
|---|---|---|---|
| conv layer | (7, 7, 1, 4) | NS | 196 |
| 1st basic layer group | (3, 3, 8, 32) | NS | 2304 |
| 2nd basic layer group | (3, 3, 32, 64) | DS | 2336 |
| 3rd basic layer group | (3, 3, 64, 64) | DS | 4672/4 |
| 4th basic layer group | (3, 3, 64, 64) | DS | 4672/4 |
| 5th basic layer group | (3, 3, 64, 128) | DS | 8768/4 |
| 6th basic layer group | (3, 3, 128, 25) | DS | 4352/4 |
| 7th basic layer group | (3, 3, 25, 25) | DS | 850 |

wherein a size (a, b, c, d) refers to kernel kernel sizes a and b, a number of input channels c and a number of output channels d; wherein a type of the layer indicates a type of convolution as non-separable, NS; or depth-wise separable, DS; and wherein #(mul) indicates a number of multiplications of the layer.

9. The apparatus of claim 1, wherein the ALF comprising the CNN to implement at least a part of the soft classification, the CNN being based on:

$$\hat{y} = y + \sum_{k=1}^{L} \phi_k(y \mid \Theta) \cdot (y * f_k).$$

wherein ŷ is a result of the adaptive in-loop filtering; y is a reconstructed frame prior to in-loop filtering; L is a number of classes into which the classes are classified; $\Phi_1, \ldots, \Phi_L$ define the classification outputs and $f_k$ is the FIR filter associated with class k, ⊖ defining the weights of a at least one, of some or all layers of the CNN.

10. The apparatus of claim 9, being configured for receiving, the parameters of FIR filters, e.g., filter weights and/or a size or shape thereof as part of the bitstream.

11. The apparatus of claim 1, wherein the apparatus is configured to implement the soft classification by convoluting, batch-normalizing implementing a rectified linear (ReLU) activation function.

12. The apparatus of claim 1, wherein the apparatus is configured to implement the soft classification by use of a CNN that is adapted to use, for classifying the reconstructed samples of a frame, at least one of:

a quantization parameter, QP, information, e.g., a QP parameter plane;

a reconstructed version of the frame prior to a deblocking filter, DBF; and a prediction signal from an inter or intra prediction based on the frame.

13. The apparatus of claim 1, wherein a 1st basic layer group of a CNN of the soft classification is adapted to receive 8 input channels, preferably exactly 8 input channels.

14. The apparatus of claim 13, wherein the 8 input channels comprise:

a quantization parameter, QP, information, e.g., a QP parameter plane; a reconstructed version of the frame prior to a deblocking filter, DBF; and a prediction signal from an inter or intra prediction based on the frame; four output channels of a convolutional layer connected to the 1st basic layer; and the reconstructed input frame.

15. The apparatus of claim 1, wherein the soft classification is to identify dominant features around a sample location.

16. The apparatus of claim 1, wherein the soft classification comprises a subsampler for providing a subsampling operator.

17. The apparatus of claim 16, wherein, for implementing the subsampling operator, the soft classification comprises a CNN that comprises a max pooling operator with 3×3 window followed by a 2DN downsampling with factor 2 that is applied to output channels of a second basic layer group of the CNN; wherein in a last last layer of the CNN, the downsampling step is reverted by an upsampling with trained upsampling filters.

18. The apparatus of claim 1, wherein the soft classification is configured for a depth-wise separable convolution.

19. The apparatus of claim 18, wherein the depth-wise separable convolution comprises a filtering process in two parts; wherein a first part comprises a 2D convolution with a $k_1 \times k_2$ kernel that is performed independently over each input channel of the soft classification; wherein a second part comprises a full convolution but with 1×1 kernels that is applied across all channels.

20. The apparatus of claim 1, wherein the soft classification is adapted for applying a softmax function to a output channels of a last, e.g. seventh, basic layer group of the soft classification.

21. The apparatus of claim 1, wherein the softmax function comprises a structure based on $$\phi_k(i) = \frac{\exp(\psi_k(i))}{\sum_{\ell=1}^{L} \exp(\psi_\ell(i))} \text{ for } i \in I.$$

wherein $\Phi_k(i)$ is intpretable as an estimated probability that the corresponding sample location i∈I is associated with a class of index k, $\Phi_k$ is a classification output; and Ψ are the output channels of the last basic layer group.

22. The apparatus of claim 1, wherein the ALF is adapted for applying multiple 2D filters ($f_k$) for different classes k to the classified samples.

23. The apparatus of claim 1, wherein the ALF is adapted for filtering the classified samples with a clipping function to reduce the impact of neighbor sample values when they are too different with the current sample value being filtered.

24. The apparatus of claim 1, wherein the clipping function is based on the determination rule $$\sum_{i \neq (0,0)} f(i)\text{Clip}(y(x+i) - y(x), \rho(i))$$

to modify the filtering of the input signal y with a 2D-filter f at sample local x wherein 'Clip' is the clipping function defined by Clip (d;b) =min (b;max(-b; d)) and p(i) are trained clipping parameters used for the filtering process $y*f_k$ and for a first convolutional layer of a CNN of the soft classification.

25. The apparatus of claim 1, wherein coefficients of filters of the ALF are received as part of the bitstream.

26. The apparatus of claim 1, wherein the ALF comprises the CNN to implement at least a part of the soft classification, the CNN being adapted for a two stage filtering based on:

$$\hat{y} = y + \sum_{k=1}^{L} \hat{f}_k * (\phi_k(y \mid \Theta) \cdot (y * f_k))$$

wherein ŷ is a result of the adaptive in-loop filtering; y is a reconstructed frame prior to in-loop filtering; L is a number of classes into which the classes are classified; $\Phi_1, \ldots, \Phi_L$ define the classification outputs, $f_k$ is the first stage FIR filter associated with class k, $\hat{f}_k$ is the second stage FIR filter associated with class k ⊖ defining the weights of a at least one, of some or all layers of the CNN.

27. An apparatus for encoding a picture to a binary representation of the picture, wherein the apparatus is configured for:

receiving a frame associated with a digital representation of a picture;

deriving samples from the frame;

classifying the reconstructed samples for an adaptive in-loop filtering, ALF, using a convolutional neural network, CNN; and providing a bitstream allowing to reconstruct the samples.

28. The apparatus of claim 27, wherein the adaptive in-loop-filtering is based on adaptive filters $\hat{f}_k$ wherein the encoder is adapted to transmit filter coefficients of the adaptive filters in the bitstream.

29. The apparatus of claim 27, wherein the apparatus is configured for determining coefficients of the adaptive filter such that the mean squared error between the reconstructed frame and the filtered reconstructed frame is minimized.

* * * * *